US008732337B2

(12) United States Patent
Julia et al.

(10) Patent No.: US 8,732,337 B2
(45) Date of Patent: *May 20, 2014

(54) SYSTEM AND METHOD FOR DELIVERING CONTENT TO USERS ON A NETWORK

(75) Inventors: Luc Julia, Oakland, CA (US); Yohan Le Nerriec, San Francisco, CA (US); Jerome Dubreuil, Paris (FR); Joe Costello, Los Altos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/572,385

(22) Filed: Aug. 10, 2012

(65) Prior Publication Data

US 2012/0311083 A1 Dec. 6, 2012

Related U.S. Application Data

(63) Continuation of application No. 12/605,267, filed on Oct. 23, 2009, now Pat. No. 8,281,037, which is a continuation-in-part of application No. 11/325,679, filed on Jan. 3, 2006.

(60) Provisional application No. 60/641,342, filed on Jan. 3, 2005.

(51) Int. Cl.
*G06F 15/16* (2006.01)
*G06F 15/173* (2006.01)
*H04H 60/33* (2008.01)
*G06F 3/00* (2006.01)

(52) U.S. Cl.
USPC .................. 709/249; 709/224; 725/9; 725/46

(58) Field of Classification Search
USPC .................. 709/224, 249; 725/9, 46
See application file for complete search history.

(56) References Cited

U.S. PATENT DOCUMENTS

| 6,327,574 | B1 | 12/2001 | Kramer et al. |
|---|---|---|---|
| 6,446,119 | B1 | 9/2002 | Olah et al. |
| 6,453,347 | B1 | 9/2002 | Revashetti et al. |
| 6,460,036 | B1 | 10/2002 | Herz |
| 6,820,277 | B1 | 11/2004 | Eldering et al. |
| 6,850,252 | B1 | 2/2005 | Hoffberg |
| 7,162,451 | B2 * | 1/2007 | Berger et al. ............... 705/51 |
| 7,284,033 | B2 * | 10/2007 | Jhanji ............... 709/206 |
| 7,290,278 | B2 * | 10/2007 | Cahill et al. ............... 726/6 |
| 7,979,880 | B2 | 7/2011 | Hosea et al. |
| 8,046,797 | B2 | 10/2011 | Bentolila et al. |
| 8,281,037 | B2 | 10/2012 | Julia et al. |
| 2002/0092019 | A1 | 7/2002 | Marcus |
| 2002/0124182 | A1 | 9/2002 | Bacso et al. |
| 2002/0194589 | A1 | 12/2002 | Cristofalo et al. |
| 2003/0110503 | A1 | 6/2003 | Perkes |
| 2003/0158960 | A1 * | 8/2003 | Engberg ............... 709/237 |
| 2003/0182567 | A1 * | 9/2003 | Barton et al. ............... 713/193 |

(Continued)

*Primary Examiner* — Ranodhi Serrao
(74) *Attorney, Agent, or Firm* — Mahamedi Paradice Kreisman LLP

(57) ABSTRACT

A system and method for targeting content to users of a device or network of user-operated devices. In an embodiment, profile information is determined about a user's media consumption activities. One or more inputs are received from an external source to specify what content to target to the user. One or more content items are selected to target to the user based on the profile information and the one or more inputs. The selection of content items is performed without communicating the profile information outside of the user's device or network of user-operated devices.

32 Claims, 10 Drawing Sheets

(56) References Cited

U.S. PATENT DOCUMENTS

| | | | |
|---|---|---|---|
| 2005/0038698 A1* | 2/2005 | Lukose et al. | 705/14 |
| 2006/0059227 A1* | 3/2006 | Zimler et al. | 709/203 |
| 2006/0069749 A1* | 3/2006 | Herz et al. | 709/219 |
| 2006/0195441 A1* | 8/2006 | Julia et al. | 707/5 |
| 2008/0091786 A1* | 4/2008 | Jhanji | 709/206 |
| 2008/0133716 A1* | 6/2008 | Rao et al. | 709/220 |
| 2011/0066730 A1 | 3/2011 | Julia et al. | |
| 2012/0204109 A1 | 8/2012 | Julia et al. | |

* cited by examiner

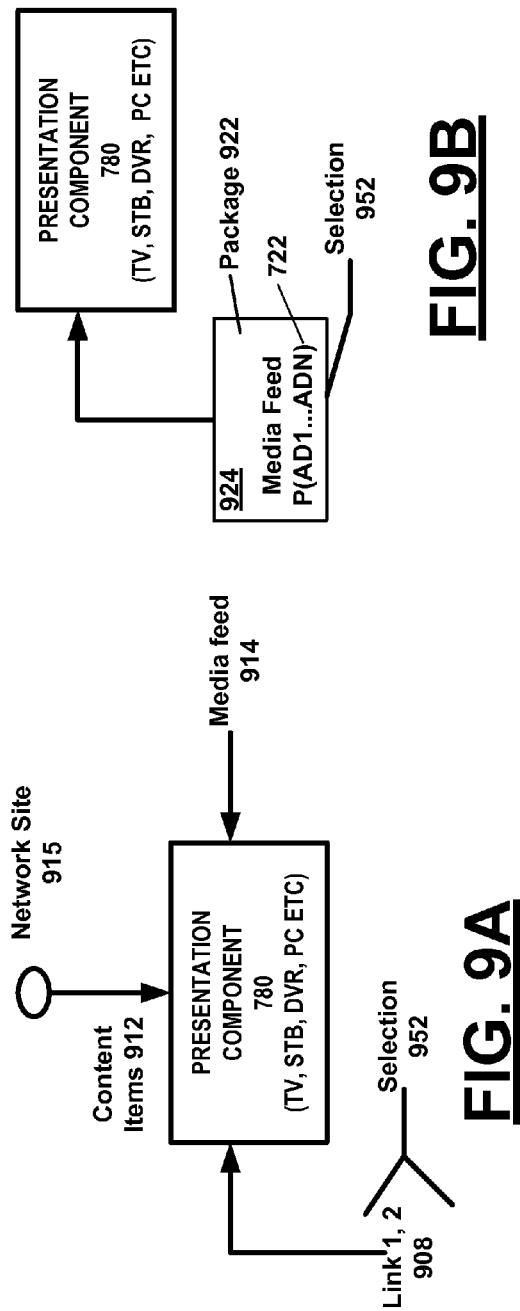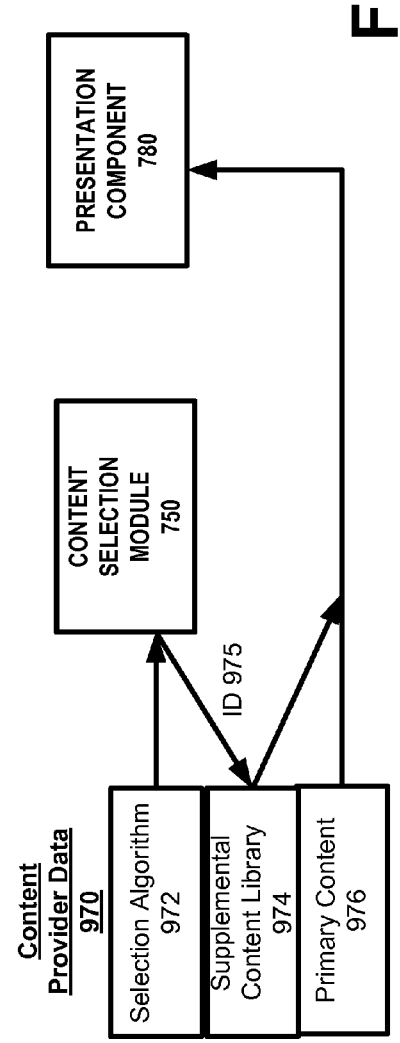

SYSTEM AND METHOD FOR DELIVERING CONTENT TO USERS ON A NETWORK

RELATED APPLICATIONS

This application is a Continuation of U.S. patent application Ser. No. 12/605,267, filed Oct. 23, 2009; now U.S. Pat. No. 8,281,037; which is a continuation-in-part of U.S. patent application Ser. No. 11/325,679, filed Jan. 3, 2006; which claims benefit of priority to U.S. Provisional Application No. 60/641,342, filed Jan. 3, 2005; all of the aforementioned priority applications being hereby incorporated by reference in their respective entirety for all purposes.

TECHNICAL FIELD

The disclosed embodiments relate generally to the field of network communications and connectivity. More specifically, the disclosed embodiments relate to a system and method for delivering content to users on a network.

BACKGROUND

Delivering targeted content to computer systems and interconnected devices has many applications. Many content delivery applications have an objective of determining whether the user is likely to be interested in the content before delivering the content to the user. To this end, an effort is made to learn information about the user. Traditional approaches have sought the placement of cookies and other data structures in order to learn some information about the user. More unscrupulous approaches have involved the use of "spyware", with the particular goal of delivering very targeted advertisements to users.

Privacy concerns have always limited the ability of content providers in acquiring information about the user. In the realm of network advertisement delivery, privacy concerns limit the ability of websites and services to target specific advertisements that are more likely to receive a positive response from the user. While targeted advertisement are known to draw more favorable responses from users (and thus are more lucrative), the ability to target advertisements in relation to computer and network activity has been limited by what information advertisement providers may lawfully or ethically obtain.

BRIEF DESCRIPTION OF THE DRAWINGS

FIG. 9A illustrates an implementation in which a selection of content items identify links that can be used to retrieve content items from a network site at a particular instance, according to an embodiment.

FIG. 9B illustrates an implementation in which a media feed is delivered with a package comprising a plurality of supplemental content items, according to an embodiment.

FIG. 9C illustrates another embodiment in which a desired content item is packaged with advertiser supplied algorithms and queries, as well as a library of supplemental content items, in order to enable the viewer's system to programmatically select an appropriate supplemental content item to view with the desired content item.

DETAILED DESCRIPTION

Figure 1:
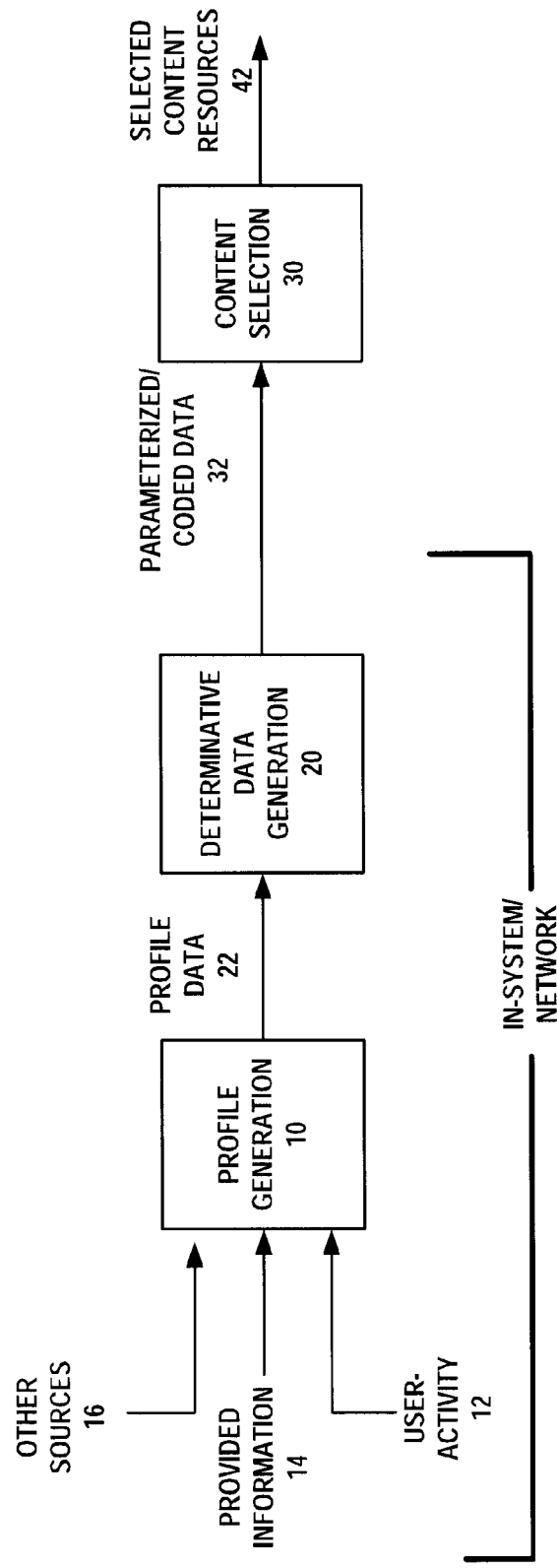
FIG. 1 illustrates a series of data flow processes that combine to enable and provide targeted content delivery to a system or network of interconnected devices, according to an embodiment of the invention.

Embodiments of the invention enable specific and targeted content delivery to connected computer systems and defined networks (such as home networks), for purpose of providing more appealing content to the viewing audience, but at the same time, maintaining privacy of any user in the audience. The targeted content may be commercial in nature, such as in the form of advertisements and infomercials. However, targeted content may also be provided to such systems for other purposes, such as entertainment.

According to an embodiment, content is targeted to a user or a group of users (e.g. an audience) through the monitoring of the activities of the user on a system or defined user-network (sometimes referred to as "designated system" or "designated network" or "targeted" system/network) that is to be delivered content. Additionally, information about the users may be obtained from stored information and files. This information may be used to enable selection of content, such that the selected content is targeted to the audience of the system or network, but the information is not disclosed outside of the user's system or network, at least not in any meaningful way. As such, information about the user remains private, while at the same time enabling programmatic selections of advertisements and other contents to be made for the designated system or network for purpose of targeting the particular user based on his demographic and/or preferences.

In one embodiment, profile information is obtained about the users of a system or network. Analysis for determining what content should be delivered to the users is performed within the system or network that is to be targeted. One result that can be achieved is that while the act of selecting content may be performed on a service that is remote to the targeted system or network, the act of selection uses results of the programmatic analysis performed internal to the targeted system or network.

According to an embodiment, targeted content is provided to a designated set of one or more interconnected resources. Programmatic operations are executed using resources that are private to the one or more interconnected devices. The operations, when executed, cause or result in (i) monitoring activities of one or more users of the designated set; (ii) developing profile information of the one or more users, where the profile information is based at least partially on information determined from monitoring activities of the one or more users; (iii) generating, from the profile information, a set of coded data that represent selection criteria; and (iv) communicating the set of coded data to a programmatic source external to the system, where the represented selection criteria enables programmatic selection of content resources from a content library for the system.

A designated set of one or more interconnected resources includes any combination of computers, devices, applications, and network resources (e.g. online accounts hosted by third parties) that are designated to belong or be for use by a user or group of users, and which are linked to each other through data channels, networks and/or intermediate devices or resources. A designated set of one or more interconnected resources includes, for example, (i) a single desktop computer connected to the Internet, (ii) a combination of two such connected computers connected over the Internet, (iii) a desktop computer and a cellular phone or other device in communication over cellular networks and the Internet, (iv) a home network, or (v) a "personal network" such as described in U.S. patent application Ser. No. 10/888,606, the aforementioned application being incorporated by reference in its entirety and for all purposes.

In one embodiment, the set of parameters may be identified as the selection criteria through use of a parameter reference resource. Implementations of the parametric reference source include predefined profiles based on designated parametric values, or ranges thereof.

According to another embodiment, a system is provided having a profile engine and a content requestor. The profile engine is configured to build one or more profiles of one or more users of the designated set of interconnected resources. The content requestor component communicates a set of coded data to a programmatic source that is external to the designated set, where the set of coded data represents selection criteria determined from the one or more profiles. When the set of coded data is decoded by the external programmatic source, the represented selection criteria enables programmatic selection of content resources from a content library. The selected content may be targeted for the designated system or network.

The term content may include images, text and/or media. Content items include files or data that carry or represent content. Content resources include content items, or data for locating or using content items and data. Examples of content contemplated by one or more embodiments of the invention include advertisements (text ads, banner ads, dynamic media), commercials, infomercials, and audio or video messages.

Methods described with this application, or portions thereof, may be performed programmatically. As used herein, the term "programmatically" means through the use of programming, code or computer-implemented instructions.

Additionally, one or more embodiments described herein may be implemented using modules. A module may include a program, a subroutine, a portion of a program, a software component or a hardware component capable of performing a stated task or function. As used herein, a module can exist on a hardware component such as a server independently of other modules, or a module can exist with other modules on the same server or client terminal, or within the same program.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holing data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums. Furthermore, processes and methods (including recited steps or sub-steps) should be assumed to be operated on computing devices through use of processors and memory.

Process Overview

FIG. 1 illustrates a series of data flow processes that combine to enable and provide targeted content delivery to a system or network of interconnected resources, under one or more embodiments of the invention. In an embodiment, content is targeted because it is selected for user(s) of a system or network. For purpose of description, one user is assumed to be on a designated system or network that is to be delivered targeted content. However, any given system or network may have more than one user, in which case multiple users of a system may be treated individually or as a composite.

As mentioned, targeted content is content that is deemed to be of interest to users of the system or designated network. In order to identify what is likely to be of interest to users, information is needed about the users. In general, more specific and voluminous information yields better identification of what content is more likely to be of interest to a particular user or set of users. In addition, the specificity of content that is to be delivered, as well as the ability of such content to be of interest to the user, may be directly tied to the quality and amount of information known about the users of the system or network.

FIG. 1 illustrates an embodiment in which significant and specific profile information may be obtained about a set of users on a system or network for purpose of selecting content for that system or network, while at the same time maintaining the privacy of such users. According to one or more embodiments, some or all of the significant steps needed to select relevant content is performed entirely within the system or network that is to be targeted. As shown by FIG. 1, one embodiment provides for a profile generation process 10 and a determinative data generation process 20 to be performed internally on the system or designated network. The profile generation process 10 may receive, identify, or procure profile information of various kinds. Profile information may include any information about a user, including information that identifies the user's preferences, information about data and information stored on the user's computer(s), and information about the user's network and computing activities. Examples of profile information include information about web-browsing and usage activities, such as any of the following: bookmarks, recently visited web sites, search terms entered or used, advertisement media selected for viewing, services registered, and e-commerce activities (e.g. online purchases, auction bids). Some activities may be related to the media that the user consumers, such as music/video purchased, play-lists (of music and/or video) created, and music/video streamed or shared with others. Still further, profile information determined from observed activities may extend to devices other than web-browsing computers, including digital video recorders (e.g. programs recorded or watched, on-demand viewing) and game stations (e.g. what games played, what services and functionality used (e.g. player to player chatting) with the game consoles). Information may also be determined about devices or resources used by the user(s), such as make, type and model of computers, cell phones or televisions. Numerous other examples of profile information exist, including demographic information (e.g. age, gender, profession), personal identifiable information (e.g. first name, email address), non-personal identifiable information (e.g. make of car driven, zip code), and information provided by the user in response to surveys and questionnaires. Still further or additionally, profile information may be manually entered by the user and stored. For example, the user may provide non-specific or non-personal information, demographic information (e.g. race, sex, zip code) or voluntarily provide information, such as through a registration process. One embodiment contemplates the user completing a form for receiving targeted information, while another also contemplates the user providing information to have his information retrieved from other service providers and third-parties (e.g. cellular phone companies).

According to one embodiment, profile generation process 10 also receives instructions or a guide as to what information should be collected. For example, the profile engine 10 may receive instructions that update or modify what activity of the user is monitored, and such information may be altered or changed over different periods of time. As an illustrative example, the profile information may specify during the Christmas periods what online shopping purchases the user is making, but switch to monitoring what music the user is listening to or purchasing in summer months.

Furthermore, profile information may be determined from a variety of sources. FIG. 1 illustrates general sources that include programmatic monitoring of user-activity 12, provided user-information 14, and/or information identified, determined or analyzed from different sources ("other sources 16"). More specific examples of the different sources of profile information include a program or process on the user's designated system that scans or culls stored files and data for information deemed to be pertinent for creating a profile. Alternatively, some or all of the profile information may be gathered on an ongoing basis, through use of programmatic agents and monitors, or other devices. Still further, profile information may be identified from a data store, or determined through more complex analysis of user-behavior or input.

The profile generation process 10 uses the profile inputs to generate profile information 22, corresponding to data identified about the user and his activities. The determinative data generation process 20 uses the profile information 22 to make determinations that are carried in the form of parameterized or coded data 32. The determinations made by the profile information may have direct effect as to what content is selected for the designated system or network. However, since the content library from which content is eventually selected is not known at the time the determinations are made, an embodiment provides that the determinative generation process 20 does not make the selections of content resources. Rather, sufficient determinations are made within the boundary of the designated system or network so that coded data 32 can be used to make selections outside of the designated system/network, without any meaningful information about the user or his profile being identifiable from the coded data 32.

Outside of the designated system/network, a content selection process 30 is invoked using the coded data 32. In one embodiment, the coded data 32 is matched to a network profile that best suits the data provided, and content resources 42 are selected based on the matched network profile. However, different algorithms may be used to take parameterized or coded data and convert it into selections. For example, algorithms may combine, weight or prioritize parametric values in order to identify what content resources are best suited for the designated system/network as a whole, or alternatively for individual users of the network/system, or still further, for different components or types of activities.

Thus, selected content resources 42 may be specific to a user, class of user, type of device, or type of user-activity. For example, in web browsing activities, the selected content resources may correspond to one or more of (i) ad-links or banners, (ii) dynamic hypertext media language (DHTML) content, (iii) audio/video clips, (iv) email or ad-based messages, and/or (v) links to such content. The selected content resources 42 may be signaled to the designated system/network. However, in an alternative implementation, selected content resources 42 are signaled or communicated to third-parties that directly or indirectly provide such content to the targeted system after receiving identification of the content resources. In the latter case, some of the content selected for a particular system/network may be known to third-parties, but the information that resulted in that selection being made is not known outside of the designated system or network.

Figure 2:
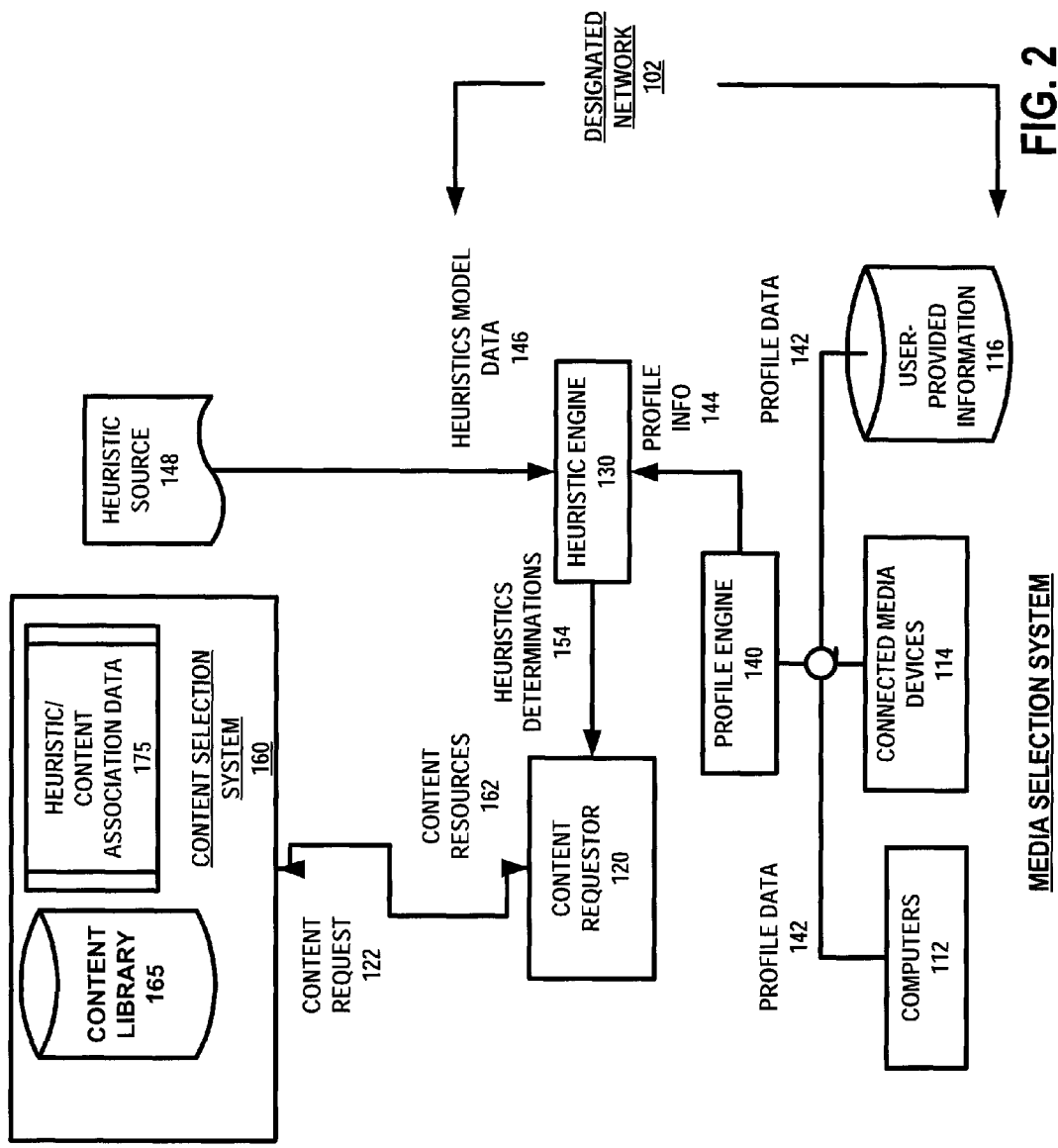
FIG. 2 illustrates a system for delivering targeted media to a designated set of interconnected devices, under an embodiment of the invention.

FIG. 2 illustrates a system for delivering targeted media to a designated set of interconnected devices, under an embodiment of the invention. A system such as described with FIG. 2 may be used to implement, for example, data flow processes such as described with FIG. 1. A portion of the overall network may be provided within the network boundaries of the designated set of interconnected devices ("designated network" 102). The boundaries of the designated network 102 are logical, and refer to devices that are under common control or ownership, and interconnected to be part of the designated network 102. The boundaries of the designated network 102 may also include resources (e.g. such as programs on one account or profile of a server or station that has many accounts or profiles) that are under the use of the designated network 102.

According to an embodiment, the designated network 102 includes a content requestor 120, a heuristic engine 130, and a profile engine 140. The profile engine 140 may procure or access profile data 142 about a user of the designated network 102 from various sources, including computers 112 (e.g. media center computers, personal digital assistants, cellular devices and smart phones), connected media an media devices (e.g. gaming console or digital video recorder), and a data store of profile information 116 (such as those provided or made available by the user). Profile engine 140 may obtain profile data 142 from these various sources, and develop one or more profiles about the user of the designated network 102.

Profile information 144 relating to developed profiles may be communicated to the heuristic engine 130. The heuristic engine 130 may also receive a heuristic model or model data 146 from an external source 148 in order to enable the heuristic engine 130 to use heuristics-based determinations. In one implementation, the heuristics specify rules, conditions and outcomes for parameters and factors that include the profile information 144. A specific example of the heuristics that can be used by the heuristic engine 130 includes performing a series of if/then determinations. For example, profile information 144 may carry data indicating recent purchases of online music, and the heuristic determinations performed by the heuristic engine 130 may determine whether the user recently purchased music, and if so, what genre of music was purchased. In one embodiment, the heuristic model data 146 may provide the specific heuristics that are used to make the determinations, based on the profile information 144. In another embodiment, the heuristic model data 146 carries information for configuring or selecting specific heuristic determination. For example, selecting content resources may include a process in which specific heuristically determined profiles are matched to content resources, and the model data 146 may specify the heuristics and other information for enabling the profile information 144 to be used for identifying matching content items.

In an embodiment, heuristically based determinations 154 are generated by the heuristic engine 130 and then communicated to the content requestor 120. In one embodiment, the heuristic based determinations 154 are an implementation of the determinative data generation process 20 of FIG. 1. As such, the heuristic determinations 154 may be based on data that is substantially determinative of what content will eventually be selected for the designated network 102. The content requestor 120 receives the heuristic determinations 154 and converts the heuristic determinations 154 into a request 122 for content. In the end form, the heuristic determinations 154 may be represented as parameters or other form of coded data, and the content request 122 is handled and received by a server-side content selection system 160.

In one embodiment, the content selection system 160 performs the act of selecting content resources 162 for the designated network 102. Generally, one or more embodiments provide that the content request 122 carries a set of coded data that specifies selection criteria or factors (such as provided by the heuristic determinations 154), and content selection system 160 decodes the coded data to identify selection criteria or profiles. In an embodiment such as shown, the content selection system 160 includes a content data library 165, and a heuristic/content association data 175. Under one implementation, heuristic/content association data 175 (e.g. a table or index) may include heuristic profile templates that exist on the content selection system 160 prior to the content request 122 specifying any parametric or coded data. The coded data included with the content request 122 may match or fit one or more of the predefined heuristic profiles, and content resources associated with those heuristic profile may then selected for the designated system 102. Thus, while the selection of content resources is made with the content selection system 160, the selection may be preordained by the heuristic determinations 154 made on the designated system 102.

Under one embodiment, the heuristic model source 148 is included or associated with the content selection library 165, which also uses heuristic profiles to convert and match parametric data included in the request 122 with best matching heuristic profiles. Such an embodiment enables heuristic profiles to be developed, then marketed to advertisers, for example. Heuristic model source 148 may specify heuristics that determine whether profiles from the designated system 102 can match into the desired heuristic profile.

As an example, content selection library 165 may generate a desired or model profile, corresponding to a teenage male who likes a specific genre of music. The heuristics generated and passed to the designated system may serve to determine whether the user of the designated system is of the sex and age, and whether the user prefers the specific music. For example, a profile store may be accessed to determine the user's age, which may have been entered during a registration process. The sex of the user may be determined from profiling his web browsing activities. For example, if a user views sport content, he is more likely to be male. The genre of his music preference may be identified from the user's digital music library collection, or information contained in the library (such as songs most listened to, ratings, play-lists, and music recently purchased).

Methodology

Figure 3:
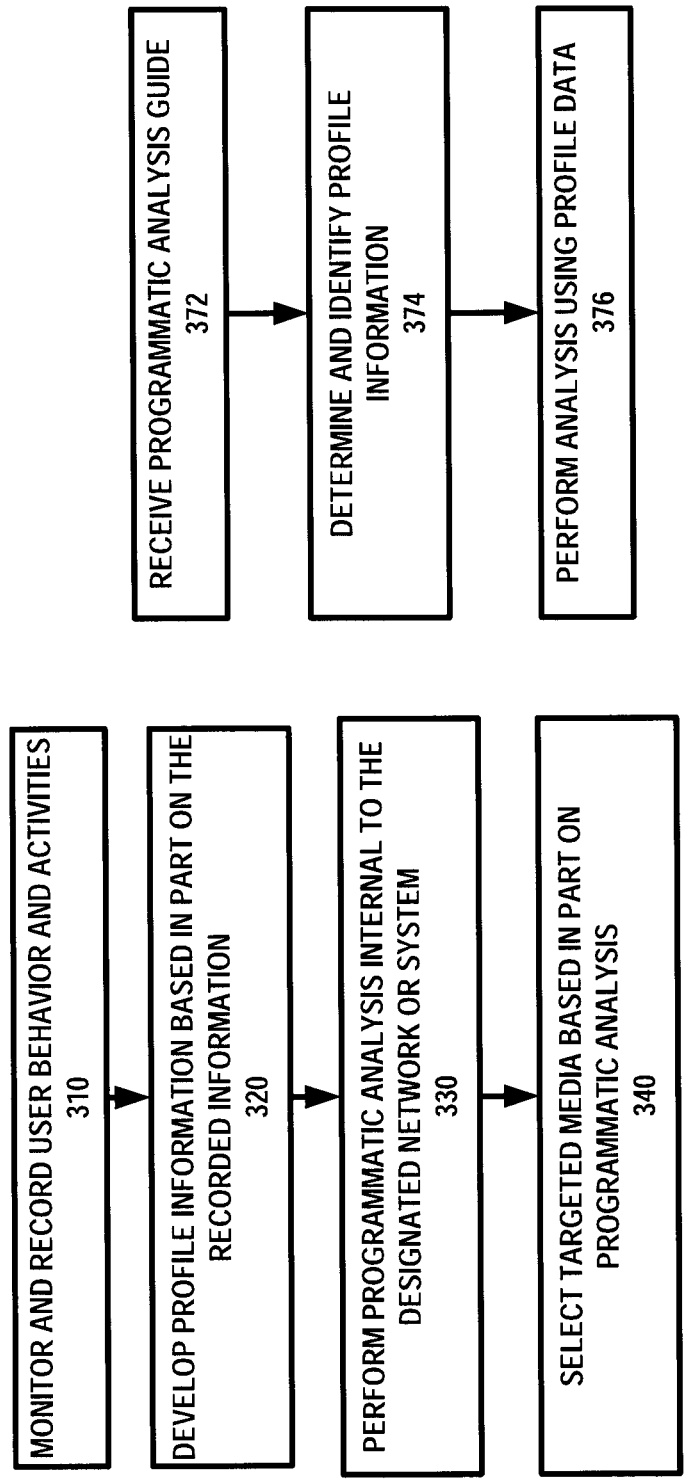
FIG. 3A and FIG. 3B illustrate basic methods for selecting and enabling selection of targeted content to a designated set of interconnected devices, under one or more embodiments of the invention.

FIG. 3A and FIG. 3B illustrate basic methods for selecting and enabling selection of targeted content to a designated set of interconnected devices, under one or more embodiments of the invention. Methods such as described provide for the procurement of specific and otherwise private information about users of a network or system for purpose of targeting advertisement and commercial related content to those users. In particular, the profile information that is procured is used to select targeted content without that information becoming usable in any meaningful way outside of the designated network or system.

In FIG. 3A, a method is described in which information about the use is procured and used. In step 310, user behavior and activities are monitored and recorded. Examples of the type of activities that may be monitored include: (i) web browsing activities, (ii) media rendering activities, (iii) channel selection for television, (iv) Digital Video Recorder (DVR) selections, and (v) online purchases and activities. Web browsing activities include, for example, bookmark selection, downloading, and web page viewing. More specific examples of media rendering activities include music and video playback. Other examples of media rendering activities include play-list selection and editing, and streaming media reception (e.g. through use of a digital musical subscription). Examples of online purchases and activities include transactions, auction bids, and log-in monitoring of online accounts.

In addition to embodiments provided, numerous other types of information may be obtained through inspection of data residing on the designated system or network. For example, such data may be inspected for indication of whether the user is a heavy or moderate digital camera user, or whether the user captures video recordings, as well as the type and quality of such images or video. Email activity may be monitored to determine if the user is a heavy e-mailer, whether the user uses his a smart phone to exchange emails, and how many email accounts the person uses. In addition, the content of the email messages handled by the user may be analyzed for key words that are useful in targeting content. Similar analysis may be performed on other types of messaging, including instant messaging or Short Message Service messaging.

Numerous other types of information may be obtained as a result of step 310. Examples of such information include a determination as to services and/or applications employed by the user. For example, step 310 may provide for monitoring as to whether the user utilizes Internet Voice-Exchange services, such as provided by SKYPE, what online photo-printing service (if any) the user prefers, what online music service the user subscribes to or prefers, and what type of portable media player the user has.

According to one embodiment, step 310 may be performed at least in part through the use of programmatic components and agents that operate in the background of one or more devices in the set. As such, step 310 may be performed programmatically, and substantially automatically.

Step 320 provides that profile information is developed based in part on the recorded information of step 310. Thus, for example, information obtained from the programmatic monitoring forms at least a portion of the overall profile.

In step 330, a programmatic analysis is performed internal to the designated set of interconnected devices and resources. For example, the programmatic analysis may be performed on a machine or device or resource in the set. The programmatic analysis may analyze information from the created profiles to identify selection criteria and/or factors that can subsequently be used to select targeted content from a content library. The selection criteria/factors may be parameterized or coded, so as to not reveal any meaningful information about the users of the interconnected set of resources. Furthermore, the selection criteria/factors may be encrypted, either when formed or at the time the selection criteria is communicated outside of the interconnected set.

Step 340 provides that targeted media is selected. The selection may be performed using the selection criteria/factors identified from the analysis of the preceding step. In one embodiment, coded and encrypted selection criteria/factors are communicated using a secure protocol to a service that decodes and identifies the selection criteria. The selection criteria/factors are then used to select content resources that match the selection criteria. In another embodiment, the selection criteria/factors can be matched against one or more profiles at the site where the content selection is made. For example, numerous profiles may be maintained, updated and created at the site or location of content selection. Each profile may identify a particular advertisement campaign or set of campaigns for one or more benefactors. Under an embodiment, the selection criteria communicated from the designated set may be deemed to match to one or more profiles, and content resources corresponding to advertisement media for each profile may then be distributed on the designated set of resources.

FIG. 3B illustrates additional steps of performing the programmatic analysis, according to one or more embodiments of the invention. In FIG. 3B, step 372 provides for receipt of a programmatic analysis guide or other resource from an external source. In an embodiment shown with FIG. 2, for example, the analysis guide is in the form of a model or template of heuristics that match to existing heuristic profiles at the content selection site. In this way, the analysis guide creates analysis and determinations that tie in to what the content selection site is anticipating and configured for. Alternatively, the guide may actually serve as instructions or determinations that are executed, and updated periodically to reflect current interests in targeting advertisement and other content.

In step 374, profile data is obtained from the user or users of the set of interconnected resources. As mentioned, the profile data may be programmatically procured, using various resources, including existing data stores, user-actions, and data residing on computers or other resources that form part of the set of interconnected resources.

According to an embodiment, step 376 provides that the programmatic analysis is performed using profile data, representing user activity and behavior on the set of interconnected resources, and programmatic analysis as specified, configured or updated by the guide. The result is the determination of profiles, which can be correlated to existing profiles at the site or location where content selection is to be performed.

Figure 4:
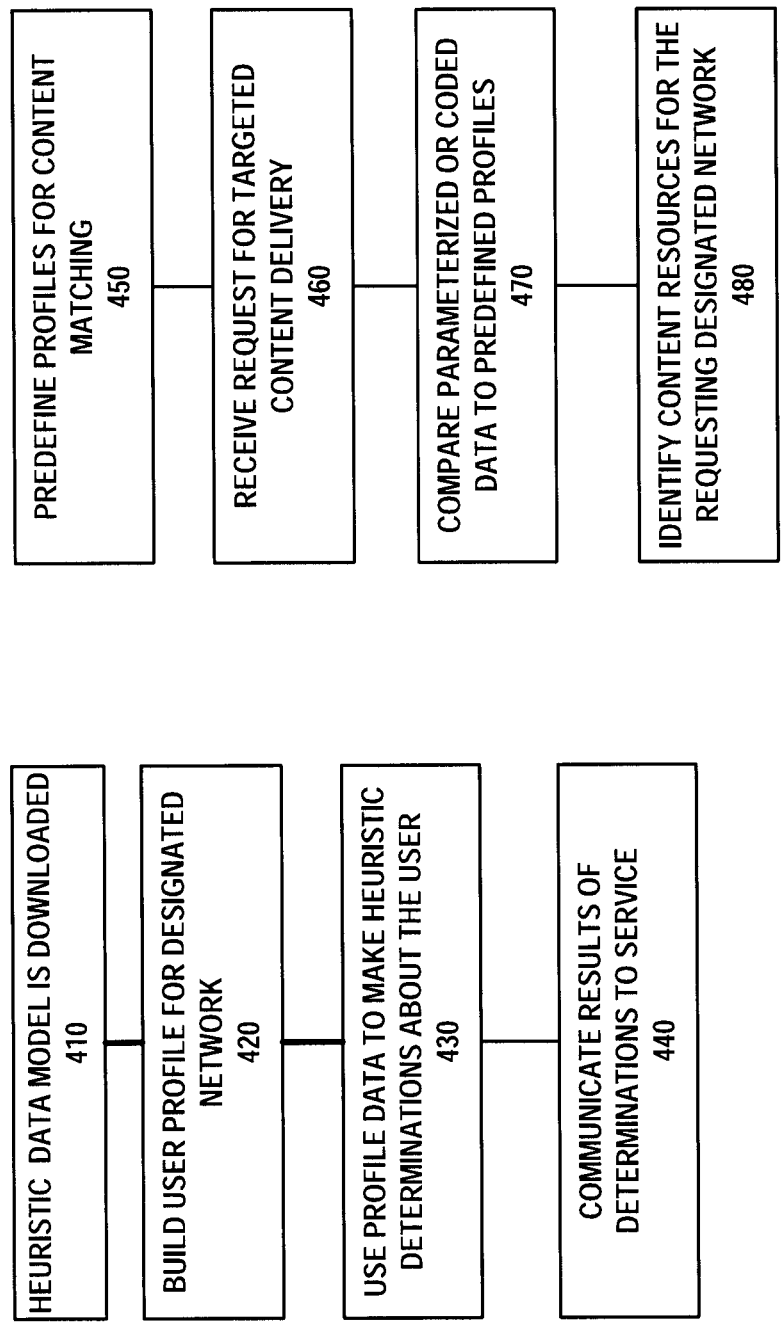
FIG. 4A illustrates a more specific embodiment for using heuristics and profile data to select content for a designated set of resources, according to an embodiment of the invention.
FIG. 4B illustrates a method performed to select content based on the communicated results of the determinations made on the designated system or network, according to an embodiment of the invention.

FIG. 4A illustrates a more specific embodiment for using heuristics and profile data to select content for a designated set of resources, according to an embodiment. A method such as described with FIG. 4 may be used with, for example, a system such as described with FIG. 2. Accordingly, reference made to elements of FIG. 2 is made to describe a suitable component or element for performing a step or sub-step being described.

In step 410, a heuristic data model is downloaded onto the designated set of resources. In one implementation, the heuristic data model is downloaded at a period of low user-activity, such as at night time. The heuristic model data may provide instructions and specification as to what heuristic operations are to be performed in making programmatic determinations based on profile data. In an embodiment such as shown by FIG. 2, the heuristic data model configures or enables the heuristic engine 130 to make determinations based on the use of profile data.

Independently, step 420 provides that one or more profiles of users of the interconnected set of resources is built through programmatic monitoring of activities, and processes to scan for and/or analyze specific data stores or data existing on the interconnected set.

In step 430, profile data is used to make heuristic determinations about the user. Results of the heuristic determinations may be in the form of parameters or parameter data sets. Such parameter data sets may be coded, such as through additional encryption or encoding. However, such form of data includes inherent protection of the user's profile information because, among other reasons, (i) it is not understood unless mapped to the identical heuristic determinations, (ii) the heuristics that generate the parameterized data change, (iii) parameterized values may be the same for more than one heuristic determination. Thus, for example, the heuristic engine 130 may output parameterized data that is inherently coded and represents the results of heuristic determinations, as created or updated by heuristic model data 146.

Step 440 provides that the parameterized and coded results of the determinations made in step 430 is communicated to a site or service where content resources are selected for the designated system or network. The parameterized and coded results may be communicated through structuring of a content request query, for example, that includes the parameterized data in an encoded and/or encrypted form.

FIG. 4B illustrates a method performed to select content based on the communicated results of the determinations made on the designated system or network. In step 450, profiles are defined for matching content resources from an inventory to a particular set of resources. Under one embodiment, the profiles are pre-defined so as to be existing before the queries and request for content selection are received. Pre-defined profiles may be based on the existing content inventory, or on what content resources are to be fielded to users of networks and systems being served.

Step 460 provides that a request or other communication for targeted content delivery is received. For example, the content requester 120 may send a request with parameterized and coded data, corresponding to determinations made by the heuristic engine 130.

In step 470, the parameterized or coded data that represents the analysis performed internally within the designated network or system is compared or matched against the pre-defined profiles. For example, the parameters of the request that are generated by the heuristic engine 130 are compared to predefined profiles. The profiles that are sufficiently satisfied by the parameters in the request are identified.

In step 480, content resources are identified for the requesting system. These content resources may include content resources that have been previously associated with the predefined profiles that are satisfied by the parameters contained in the request. Thus, not all content resources selected for a particular system are targeted.

According to an embodiment, the identified content resources are signaled to the requesting system. The content resources may include content items for different kinds of devices and communications, For example, the content resources may include a packaged media content and/or media content combined with programmatic attributes for playing back or presenting media and enabling interactions by the user. Such content may be delivered for use with a programmatic resource of a user's computer, such as the user's web browser, media player, or on the user's desktop. Examples of content resources include files or sets of data in which audio, video, images and/or text can be rendered and/or played back. More specific examples of content resources include banner ads having text, images, video and/or audio, with links to network sites where services and products are offered. Another example of a media content resource includes audio/video commercials and messages, or presentations that require user-input, such as surveys.

While content resources may be delivered for rendering and use on a computer, other embodiments contemplate content resources that can be shared or distributed to devices operating multiple platforms, such as mobile cellular communication devices, gaming consoles, or even a DVR. Thus, for example, a media file may be displayed on the user's desktop and on his cellular device, or different files may be rendered on the respective devices.

As an alternative, content resources may be provided in the form of links to files. For example, a program executing on the requesting system may receive links to content that are targeted for the system, rather than the actual file itself. For example, one or more link managers may execute on a requesting system and operate on different devices or resources of that system. A link manager may trigger retrieval of targeted advertisement or other content. For example, a link manager may trigger a web browser to fetch specific files identified by the links when the web browser is launched.

Multi-Platform User-Defined Networks

Figure 5:
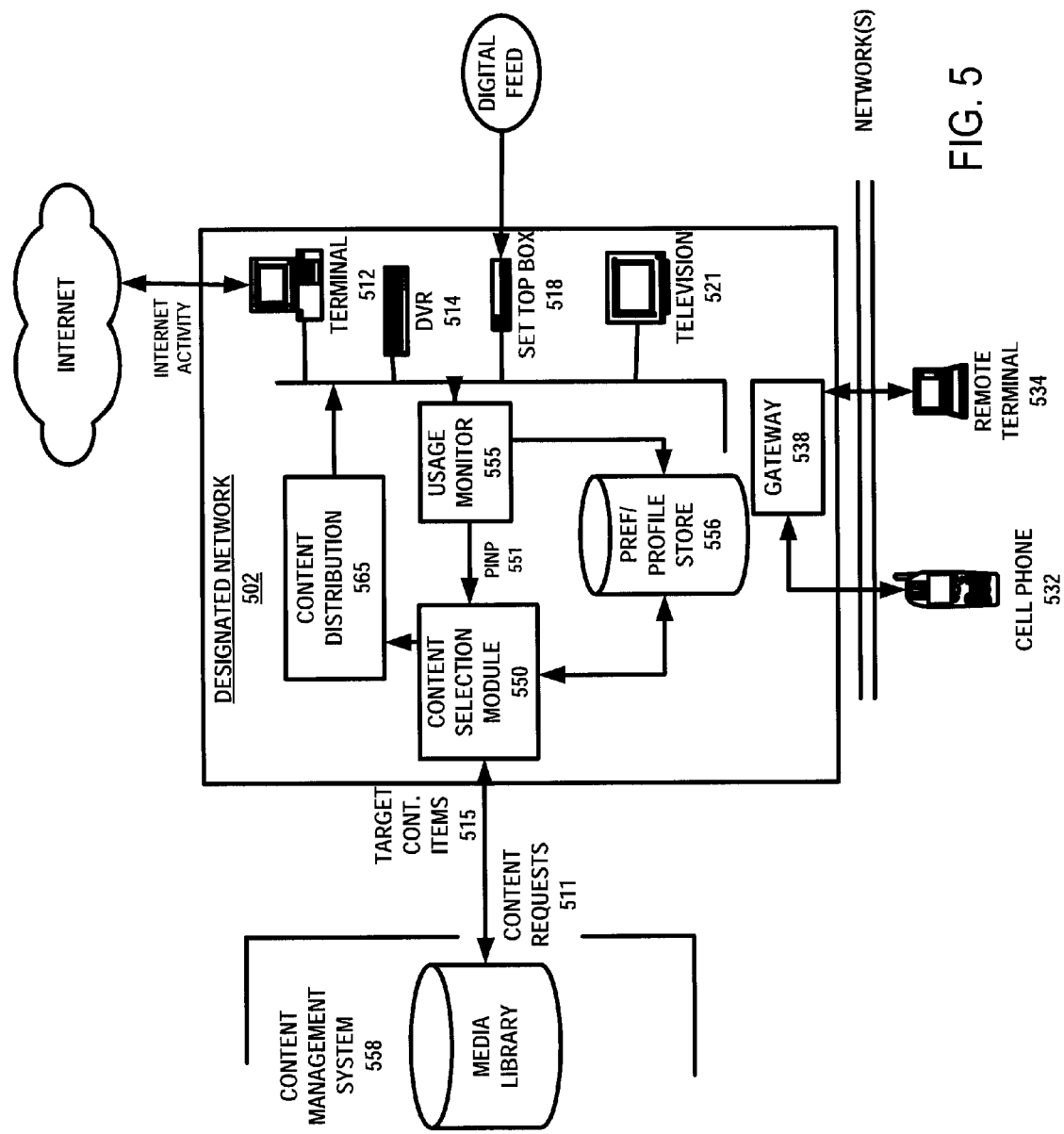
FIG. 5 illustrates the components and functionality of the different systems that enable the use and selection of content resources based on user profile information, without disclosure of the profile information outside of the user's system, according to an embodiment.

FIG. 5 illustrates the components and functionality of the different systems that enable the use and selection of content resources based on user profile information, without disclosure of the profile information outside of the user's system, according to an embodiment. In an embodiment such as shown by FIG. 5, the designated network of interconnected resources is a "personal network", which is described in more detail with U.S. patent application Ser. No. 10/888,606; the aforementioned application being incorporated by reference herein in its entirety. A personal network is a set of interconnected devices and resources that can communicate and share data across networks, domains, and platforms. Individual components of a personal network are aware of other components and their capabilities, particularly when the other components are relevant to that component. However, numerous other kinds of systems may be used. For example, a system such as shown by FIG. 5 may correspond to a home network, in which computers, computing devices and media devices are interconnected with one another to share data and to enable Internet connectivity of different devices. Alternatively, no network is needed, as an embodiment may be implemented on just one connected computer, such as a desktop computer or media station.

In an embodiment shown by FIG. 5, the designated network includes a media station computer 512, a digital video recorder (DVR) 514, a set top box 518 for receiving digital television media (e.g. via satellite of cable), and a television monitor 521. The devices may be interconnected through the media station computer 512. In addition, the user's system may include remotely and intermittently connected devices, such as a cell phone 532 and a remote terminal 534. Such devices may communicate with one or more other devices in the user's system through a gateway 538.

Embodiments of the invention provide that the designated network 502 is equipped with components that execute processes for selecting content items and for obtaining profile information about the user of the network. Accordingly, the designated network 502 includes a content selection module (or system) 550, which according to one embodiment and implementation, may correspond to a combination of the content requestor 120 (FIG. 2), and heuristic engine 130 (FIG. 2). The content selection module 550 may also include some or all of the functionality of profile engine 140 (FIG. 2). Additionally, the designated network 502 may include a usage monitor 555, which includes programmatic components and agents for procuring data relating to the user's activities on the designated network. This may include observing user actions, inspecting files and data entered or used by the user. Specific devices that may be monitored by the usage monitor 555 include the media station computer 512 (or software applications running on the computer), the digital video recorder (DVR) 514, the set top box 518 and even the television monitor 521. The cell phone 532 may also be monitored on occasion, such as when data is exchanged between the cell phone and the designated network 502. The remote terminal 534 may be monitored in a similar manner. Additionally, the usage monitor 555 may access a data store 556 that stores known information about the user or users of the designated network 502 (provided information 14 of FIG. 1). This information may also include user-preferences.

The content selection module 550 uses the information about the content items and the profile information to select targeted content items for the user's system. As described with an embodiment of FIG. 2, for example, the content selection module 550 may receive programmatic analysis tools in the form of heuristics and heuristic data models to enable heuristic based determinations to be made from the profile inputs 551 of the usage monitor 555. The profile inputs 551 may be used to create profiles (such as described with FIG. 2) and to execute determinative heuristics that yield result-oriented parameters. These parameters are used to form content requests 511 of the content management system 558. As described elsewhere, the content management system 558 decodes the content requests 511 using, for example, heuristic profiles, and selects targeted content items 515 for delivery to the designated network 502. In an embodiment shown, the content management system 558 includes a content or media library that it manages.

The content selection module 550 may yield different content items and resources make for different devices. For example, the content selection module 550 may identify content items corresponding to television commercials for when the television is used. At the same time, the content selection module 550 may select web-based advertisement for use on the media station, particularly when the web browser is in operation.

According to an embodiment, delivered content items 515 may be distributed to one or more devices of the system. In one embodiment, all content items are made accessible to a content distribution component 565. The content distribution component 565 distributes the content to all or select devices. In one embodiment, the content distribution component 565 can reformat content items 515 for different platforms and device capabilities (e.g. screen resolution, audio capabilities, available bandwidth), as well as device-specific applications. Devices on different platforms sometimes use different components to perform the same functionality. Thus, if a particular content item 515 is a banner advertisement or other web-based content, the content distribution component 565 may format or configure the content item 515 for display on each of the media station and the cellular device. Each of these devices may employ different web browsers, suited for the particular platform and capabilities of the respected devices. Thus, according to one embodiment, the content distribution component 565 may format the particular content item for use on each platform, device form-factor (including screen resolution) and pertinent application. When multiple devices are contemplated, the content distribution component 565 may be configured to identify what devices are to receive particular content items, and also to ensure the received content items are properly formatted. Furthermore, the content distribution module 565 may be configured to ensure the content items 515 are actually delivered to the pertinent devices of the user.

Still further, the content distribution component 565 may be absent from the designated network 502, are not used on occasion. Rather, links and identifiers of content items may be communicated directly or indirectly to content providers (e.g., third party providers), who then arrange to have the particular content item provided to a corresponding device of the user. For example, a content provider of the DVR 514 may communicate to that device and provide the content items that correspond to that device.

Remote or roaming devices, such as cell phone 532 and remote terminal 534 may be treated in different ways. In one embodiment, such devices are ignored. Alternatively, they may be used for one or both of dispatching selected content items, retrieving profile information, and/or monitoring user activity. The gateway 538 may be monitored in determining profile information.

Alternative Embodiments

While embodiments described above provide for content resources to be delivered to a requesting system, alternative embodiments may return data that enables targeted content delivery form other sources. For example, the content selection process 30 (FIG. 1) may generate cookies are other data structures that are accessible through the user's web browser or media player. The cookies may have a certain code that indicates delivery of specific web content or advertisements when the user browsers a designated network location or site.

Furthermore, while embodiments described above provide for the act of selecting content resources and items to be performed offsite from the user's network or system, an alternative implementation may provide for content selection to take place within the user's system or network. The following usage examples illustrate different examples and embodiments of a system in which content selection is performed within the boundaries of the user's network.

Example: A program or other component may be installed on a connected computer system operated in a closed environment, such as in a home or within a local area network. The program gathers profile information from activities of the user, data and files stored by the user, and/or information provided by the user. The home computer is also provided a content library that is regularly updated. The installed program on the computer uses information about the content items in the library and the profile information to select content items that are likely of interest, or at least suited for the user. The installed program then retrieves content items from the locally stored library and renders the content items on the user's computer system, and perhaps other components connected to the computer, such as the user's personal digital assistant (PDA), or cell phone. At no point does the profile information leave the computer on which the profile information was collected. The only communication to the user's closed system are to update the content items for the content library.

Example: The example provided above may be altered so that the user is provided a data store with information about content items. The actual content items may be left off the user's local system until they are selected. The information about the content items may then be used in connection with profile information to select targeted content items for the user. Once selected, those content items may be made available for rendering to the different devices in the user's system.

Example: The examples provided above may be further altered so that the installed program on the user's closed system queries (or send another form of outgoing communication) for either some or all of the content items or the information about the content items. The queries of the program may be configured based on profile information. But the outgoing communication does not reveal any of the profile information to any source or entity outside of the user's system or network. Information about content items may be returned as a result of the query, and this information is then used to select content items in connection with the profile information.

Furthermore, while embodiments such as described with FIG. 2 and elsewhere use heuristics, other embodiments may use alternative information and determinative processes. Under one alternative embodiment, a designated system or network of a user may incorporate and use knowledge, which may be in the form of instructions and/or information, scripts and programs. The knowledge may act as a guide for the designated system or network. Examples of how the knowledge may be used include anyone or more of the following: (i) aid in determining what profile information to use or value when selecting content items, (ii) aid in determining what content items that may match the profile information are of greater value, (iii) instruct the designated system on what profile information to monitor, collect or use in the future. In one embodiment, the knowledge may be generated in connection with updates to the content library from which content items are made available to users.

Example: With respect to any of the examples provided above, the manner in which the installed program selects content items may be configured or subject to external influence from knowledge provided by the service. For example, the knowledge may include instructions that the program uses to value certain profile information over other information, or certain content items over other items, when inspecting the characteristics and attributes of content items to determine if there is a match or satisfaction between a content item and a given profile. In the context of advertisement and promotional media valuation of profile information and content items may be based on inventory.

Example: With respect to any of the examples provided above, the knowledge may inform and/or instruct the installed program as to what profile information should be collected, and how the collected profile information may be used. For example, the knowledge may provide heuristics that specify what profile information should be used or collected, and what processes/queries should be performed to select content items.

Content Provider Tool and Media Packaging

Embodiments described herein enable a system and method for targeting content to user(s) of a device or network of user-operated devices. In an embodiment, profile information is determined about a user's media consumption activities. A content provider, advertiser or other third-party (not privy to the user's activities) may specify one or more inputs that specify what content to target to the user. One or more content items are selected to target to the user based on the profile information and the one or more inputs. The selection of content items is performed without communicating the profile information outside of the user's device or network of user-operated devices.

According to some embodiments, the profile information is determined programmatically and automatically. Still further, one or more embodiments provide for obtaining profile information that encompasses all media consumption activities of the user.

The profile information can be generated in two ways: automatic or interactive. The generated profile information includes information of general types: media consumption activities, media content stored in the user's available media libraries, and the devices that the user can access. As described, such information may be obtained programmatically and/or automatically.

According to one embodiment, profile information is obtained through use of a platform of network interconnected devices that, for a given time or duration, is 'omniscient' of the user's media consumption activities. The information state of such a platform may be deemed omniscient if the platform is able to automatically and programmatically acquire information relating to media consumption activities of the user that (i) spans different activities, content types, and device types, and/or (ii) encompasses all media consumption activities that are identifiable from the platform.

According to some embodiments, a platform or series of components is provided that acquire information about a user's media consumption activities that includes (i) media types that are subjected to user activity, including media types corresponding to audio, video or photo, websites and/or documents; (ii) activities of the user (playback, record, purchase, website tracking, store, etc.); and, (iii) metadata about media consumption activities (time of day that media consumption occurred, what device was used, etc.). Numerous other examples are recited below as to possible media consumption activities.

Throughout various embodiments described herein, the use of profile information relating to the user's media consumption activities is monitored and recorded for use in selecting or targeting content to the user that is highly relevant to the user's interest. Such targeted content may correspond to commercial content, such as advertisements (supplemental content). As an alternative or addition, the targeted content may correspond to media selected for enjoyment of the consumer, such as movies, short subject videos, music, podcasts, photos or photo slideshows, greeting cards, television (or television-like programs) (sometimes referred to as primary media content). In various implementations, content (whether supplemental or primary) can be targeted for various kinds of content types and delivery mediums. For supplemental content, the content may correspond to, for example, audio-video clips or broadcasts, audio commercials (e.g. for Internet, satellite radio), web-pages, and media layovers or placements. The mode of delivery may also be varied—for example, content may be targeted that is streamed, downloaded or 'broadcast' (e.g. over-air, via cable or satellite etc.) to the user.

Embodiments contemplate that the profile data can be comprehensive or reflect an omniscient information state of the user's media consumption activities through a platform that encompasses or connects a user's defined network of devices. As such, the profile information may encompass numerous kinds of media consumption activities that the user is engaged in. Still further, with other embodiments, the profile data can be limited or specific to specify types of devices or media consumption activities. In either case, the accumulation of profile data for use in targeting content may be achieved while maintaining the user's privacy, by precluding the data from being communicated outside of the user's defined network of devices.

Embodiments recognize that in many applications and environments, the ability for the system to maintain privacy is necessary in view of consumer and governmental demands. Such concerns are relevant even to the extent when there is potential for consumer information to be leaked or compromised. Accordingly, at least some embodiments provide that the profile information, which can be extensive and detailed, is recorded and maintained on a user's network of interconnected device, and that such information does not leave the user's network. In this way, privacy concerns are avoided.

In some embodiments, the profile information is a complete or comprehensive record (e.g. reflect omniscient information state about the user's media consumption activities) of the user's media consumption activities. The record may be complete/comprehensive in that (i) the profile information records media consumption activities across numerous media types and mediums (e.g. different file types, sources); (ii) the media consumption activities are associated with time information, including the time the media consumption activities took place (e.g. when media was experienced, when activities such as start and stop of media recording took place); and (iii) the locations of the media consumption activities, such as identified by the device in the user's network that is used to consume media or network information indicating user's location relative to the devices.

With regard to some embodiments such as described below, profile data may also include (i) identification of content consumed by a user (music, video, web pages, documents, online activity), (ii) identification of media available to the user (e.g. the user's media library, the media that is purchased or downloaded by the user etc.), (iii) identification of media content recorded by the user part of the library, (iv) how much time the user spends with a particular media consumption activity (e.g. how much television does the user watch), (v) how much media the user has recorded or available for use in a user library, (vi) how much media the user has purchased. Profile data may also correspond to device information, including information about devices that are media sources and media output devices, and information that identified, for example: (i) how many devices the user owns or operates for media consumption activities, (ii) what type of devices the user has, (iii) how many devices the user actually uses, or uses on a regular basis. Profile information may also be recorded that is specific to a particular media item or media consumption activity. In television programming (both by broadcast or by download), this type of profile information may include (i) what programs the user watches, (ii) what programs the user watches the most, (iii) what program a user watches before another program, (iv) what programs the user never watches, (v) what programs the user records. A program may correspond to a television series, movie, or other audio-visual work that has a general theme or storyline. As the examples described above illustrate, the profile information may include raw data (e.g. what program the user watches) and calculated data (e.g. what program the user watched the most). Some calculated information may be predetermined, while others may be determined on-the-fly in response to events. The profile information may extend to metadata information, such as described with prior embodiments. Furthermore, correlation data may be determined or recorded. The correlation data may be prompted into determination by queries from advertisers. This information may seek to use statistics on the user's activity to identify, for example, the user's favorite television show and song. In short, some embodiments provide for the potential to record virtually all media consumption activities, relating to playback, media output, purchase or recording. As described by various embodiments, this information is recorded and used to develop targeted content, without revealing the profile information outside of the user's defined network.

Still further, in some embodiments, the user may volunteer information relating to, for example, his demographic (age, sex, income), preferences (i.e. his favorite musician or television program), lifestyle, type of devices in use etc. As the profile information is kept private, the user may be able to volunteer the information to enable more relevant targeting of content to the user. Volunteer information may also include information that is based on user interaction. Specific examples include instances when the user is able to identify or provide input that indicates when an advertisement or commercial content was relevant to the user. Still further, the volunteer information may include asking the user to provide likability input as to a particular media output (e.g. television show, movie or song). In addition, the user could allow the profile monitoring or acquisition components to use information about the user's preferences in his library of media, such as, for example, identification of what are the user's specified favorites.

Figure 6:
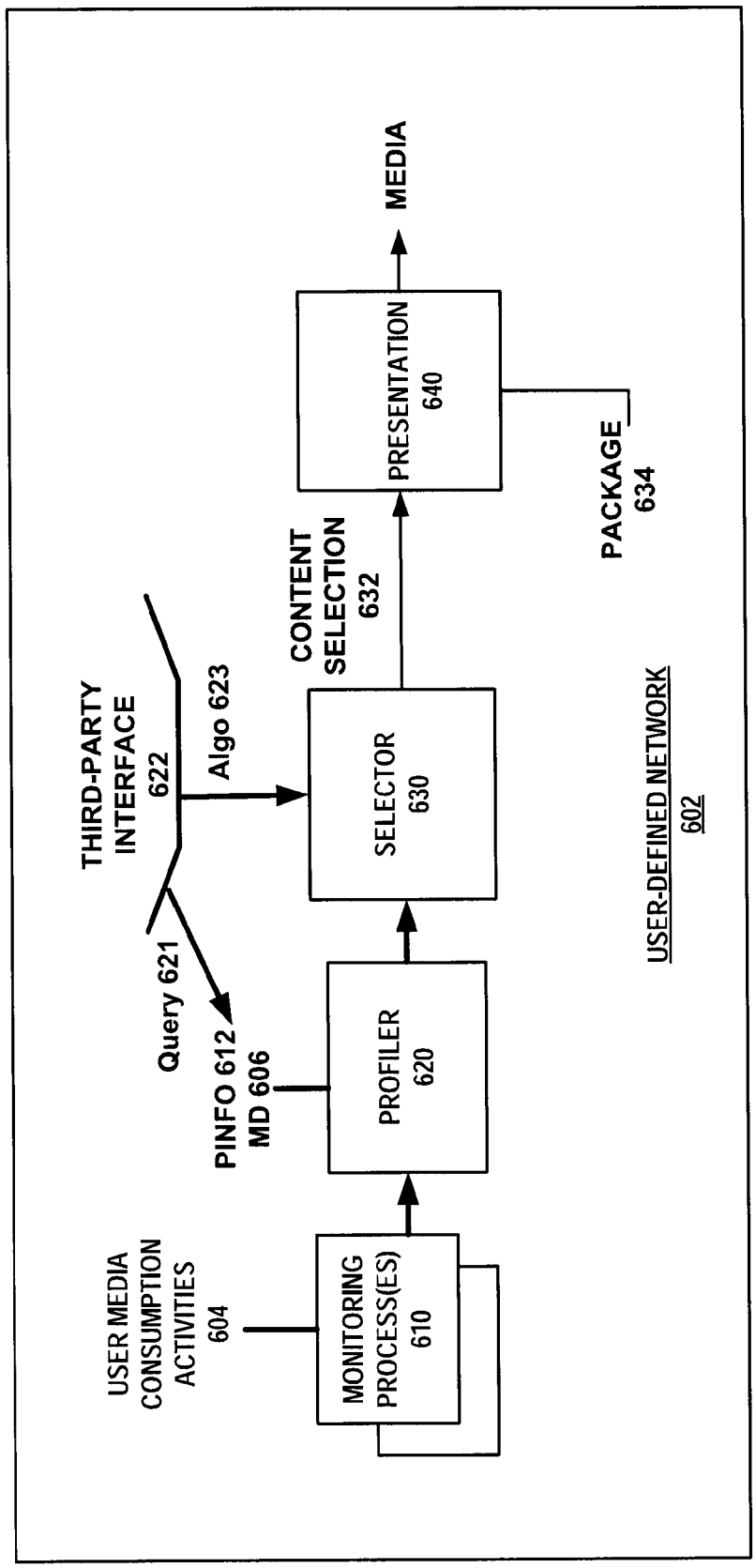
FIG. 6 illustrates AN embodiment in which a third-party interface is used to enable selection of targeted content on a user's defined network system.

FIG. 6 illustrates another embodiment in which a third-party interface is used to enable selection of targeted content on a user's defined network system. An embodiment such as described with FIG. 6 may be implemented using, for example, a system such as described by FIG. 7 or elsewhere in this application (e.g. FIG. 5). Accordingly, reference is made to elements of FIG. 7 in order to illustrate suitable components or elements for use in an embodiment such as described with FIG. 6.

In an embodiment, a defined network system 602 implements components or modules that include (or implement processes that correspond to): (i) media consumption 610, (ii) profile generation 620, (iii) targeted content selection 630, and (iv) targeted content presentation 640. In an embodiment, the defined network system 602 comprises at least one computing device, such as a personal computer, digital video recorder, or other computing device, on which programming or software operates to enable performance of the various operations/processes described with FIG. 6. The defined network system 602 may also include home networks, or combination of devices that are interconnected or otherwise share an access point (such as in a dwelling). The defined network may include or extend to devices that are interconnected across a WAN (e.g. the Internet). Still further, in some embodiments, the defined network 602 corresponds to a personal network, where individual devices or resources are owned/controlled by a user and connected to one another in a manner that enables each device to know status and capabilities of other pertinent devices.

Media consumption monitors 610 include processors that are configured to monitor and interface with one or more media consumption resources of the user. Examples of such media consumption resources includes a television, a set-top box, a personal computer, a media center, a smart television, a smart telephone, a netbook, electronic book reader, or other device that the user operates to experience media. Media consumption monitors 610 may be implemented using, for example, a personal computer that is enabled with programming or software to (i) record media consumption activities 604 performed on the computing device, and/or (ii) interface with other devices to enable and/or determine media consumption activities 604 performed on other computing devices in the defined network. In other embodiments, the media consumption monitors 610 may operate as firmware, software or hardware that reside locally on a device that is used to consume media. Examples of such devices include: television, set-top boxes, digital video recorders (DVRs), and gaming stations. The logic on these devices may report media consumption activities to a centralized device on the same network, such as to the user's personal computer. Numerous other variations and embodiments are possible. Specific examples of media consumption activities include (i) the user playing back video clips from an online site or service, (ii) what television shows the user watched (e.g. through live television shows, or through download/streaming from Internet or network service); (iii) what music the user listened to on that computing device or on any monitored device, (iv) what media the user purchased from the computing device or any monitored device; (v) what television programs or shows the user recorded for playback at a later time; (vi) what media the user purchased (e.g. on-demand, streaming movie rental etc.). In addition to media consumption activities, information about the user's devices and the user's interaction with such devices may monitored and recorded. For example, this information may identify the devices that the user uses or favors, the interactions the user has with such devices (e.g. tends to skip through content or commercial, keeps mute on etc.), the combination of devices that the user uses for some activities (use speakers with television), and the times of day the user consumes certain kinds of media. As examples, with reference to an embodiment of FIG. 7, media consumption monitor 610 may be implemented by usage monitoring processes (755) that are performed on or with computing device 710 to repeatedly interface with other devices (e.g. set-top box 718) to determine what television shows or movies the user watched, ordered (e.g. on-demand) or downloaded. Similarly, media consumption monitor 610 may be implemented by the computing device 710 to interface with digital video recorder 714 to identify what shows the user recorded. Other examples of devices that can be monitored include as digital stereo systems, digital picture frames, smart phones, and smart tablets.

The media consumption monitor 610 can be centralized (e.g. on PC or set-top box) or distributed. For example, any computing device may implement the media consumption monitor 610 by querying logs on other devices in order to determine the media consumption activities on those devices. Alternatively, at least some of the individual devices on the defined network system 602 may be configured with programming to create and/or communicate logs of media consumption activities that can be communicated to other computing devices.

The processes of media consumption monitor 610 communicate information 612 corresponding to media consumption activities 604 to the profile generator 620. In some embodiments, information 612 includes media consumption metadata 606, recorded by media consumption monitor 610. Media consumption metadata 606 includes, for example, information that (i) identifies when the user watched a television show, and (ii) if the user recorded a television show, what time of day the user watched it etc. As mentioned, this metadata may extend to device information, such as (i) how many devices the user has, owns or tends to use for media consumption, (ii) information about the type and/or capability of the devices that the user has or does use, (iii) which devices the user employs to perform certain kinds of media consumption activities, (iv) how often some of all of the devices are used for certain activities (e.g. how often are the televisions used). In the case of digital records (e.g. time-shifting recorded television shows), the media consumption metadata includes (i) how long after recorded did the user watch the recorded program, (ii) what time of day the user watched, and (iii) fast-forward or skip actions.

In one embodiment, profiler 620 structures the information 612 in a database that can be made available for blind queries and use from an advertiser or other-third party. In this way, the third-party can query or otherwise invoke processes on the data of the database, thereby using information about the user's media consumption activities, without ever learning the contents of the database. In this way, privacy of the user is maintained.

The profile database may store a complete or partial record of all of the above indicated information about the consumer's media consumption, library and devices. Under one embodiment, this raw data encompasses a complete record of all of this information (e.g. omniscient). This information may include a raw subset, as well as a processed subset. The raw subset can be made available for a content provider to query in a manner described, in order to assist the content provider in making targeted content choices. In order to enhance the process of the content provider, the processed subset of data may include some synthesized or derived information, such as those that are the result of the most common queries. For example, the processed subset may include information such as the top 20 most viewed content of each type (movies, TV, recorded TV, web videos, songs, podcasts, photos, etc). The processed subset may also include, for example, average time per week spent consuming each media type, consumption in the last week, percentage of each type of time spent on each media type, percentage of time spent viewing on each device type, media viewing percentages by time of day, etc.

In some embodiments, information derived from such queries are pre-calculated and can be modified on an ongoing basis to match what is used by the content providers for each consumer. Such use of information may enable the targeting process to become increasingly more efficient for each consumer, depending on the content provider's needs.

In order to utilize information maintained by profiler 620, a set of interfaces and tools may be integrated to enable a third-party to submit queries, algorithms and heuristics to the defined network system 602. In particular, a third-party interface 622 may be used to enable an advertiser or other third party to specify queries 621 and/or algorithms (or heuristics) 623 to enable the local select of content that the advertiser has available (e.g. commercial advertisements). The queries 621 may operate directly or indirectly (e.g. via intermediate components) on profile information 612. The algorithms 623 may configure or be implemented as selector 630, which eventually selects content for the user of the defined network. As described with FIG. 7, an advertiser may specify inputs that include parameters, algorithms or heuristics to enable conditional determinations from the contents of a profile database of media consumption activities. For example, as a simple case, the advertiser may use a web-interface to structure or specify a query for identifying one or more television shows the user watched. The query may process information recorded with the profiler 620. Moreover, embodiments enable for the advertiser to structure or specify queries 621 that enable decisions to be determined by the algorithm 623 that are multi-level (or synthesized) and blind. For example, the query 621 may extract a set of raw data from the profile information 612 identifying the user's most watched television shows, the hours watched and the media consumption activities. The results of the query are blind, in that the results are not communicated outside of the user's defined network. The algorithm 623 may execute on the results to determine information that enable content selection for the user, such as a characterization, classification and/or sub-classification of the user. In determining the content selection information, the algorithm 623 may execute functions to perform one or more queries on data from the profile information 612. In some implementations, the algorithm is relatively simple, requiring a single query of the profile database 621. In other cases, the algorithm may be complex, requiring multiple queries (or conditional queries) and complex logic between the queries that are conditional on the results. The algorithm may also generate and use queries based on results from prior queries. The results of the queries 621 and algorithm 623 are not communicated back to the advertiser, but rather communicated internally (within the user's defined network) in order to enable selection of targeted content. Examples for the results of the query may (i) identify whether the user watched a particular show, (ii) what show the user did watch on a given night, (iii) what night(s) of the week the user watch television. As will be described, the results of such a query are blind to the advertiser. The selector 630 uses the results to make selections of targeted content items.

In one embodiment, selector 630 implements the algorithm or heuristics the advertiser specified via the interface 622. As an alternative or addition, selector 630 implements the algorithm as part of its programmatic decision making process. For example, heuristics or other data specified by the advertiser may configure the programmatic decision making process of selector 630.

In one embodiment, selector 630 generates selection data 632, which makes a selection (or enables selection) of content items delivered to the user's predefined network. In one embodiment, the rendering or presentation component 640 receives a package of content items 634, from which one or subset is selected by selection data 632. For example, the package of content items 634 (e.g. commercials or media advertisements) may be received at the same time or prior to viewing of a primary media presentation (e.g. television show, streaming media presentation etc.). The selection data 632 serves to select which content items from the package 634 are to be rendered to the user. In this way, the advertiser can target, for example, a television commercial or media feed at same time that a television show or streaming media presentation is being rendered or presented. Still further, in another embodiment, the selection data 632 may take form in identifying specific content items (e.g. by links or other identifier) from which the presentation process 640 can retrieve and render. The following provide usage scenarios for one or more embodiments such as described. As another alternative, described with some prior embodiments, the selection data 632 may be communicated outside of the user's defined network to enable the advertiser to send or provide the user's defined network with targeted content.

The following provides usage scenarios for implementing one or more embodiments described herein:

Usage scenario: In connection with broadcast, download or network delivery of a television show, an advertiser (e.g. producer of the television show, or television station/local carrier) inserts four advertisements in one or more slots of the television show. The advertiser runs a query to determine what shows the user has watched recently (or at a particular time) in order to determine a (i) the media preferences (e.g. taste) of the individual; or (ii) viewership demographic of the user (e.g. male or female, age etc.). In a simple case, for example, the advertiser may run the query to determine what show the user watched before the television show that he is advertising, either in the current instance or in one or more recent prior instances. The demographic determination may coincide with learning what show the user watched just prior to watching the advertiser's show. The advertiser's algorithm or heuristic may seek to correlate a demographic of the user with one of the content items in the package 634.

Usage scenario: An advertiser may specify a query to determine viewing demographics of the user (e.g. what television shows the user watched). Based on this information, the advertiser's algorithm may select a link that the user's media presentation component must select prior to rendering, for example, a movie. To further the example, the link may display a movie trailer that the user is more likely to be interested in, based on his viewership demographic.

Figure 7:
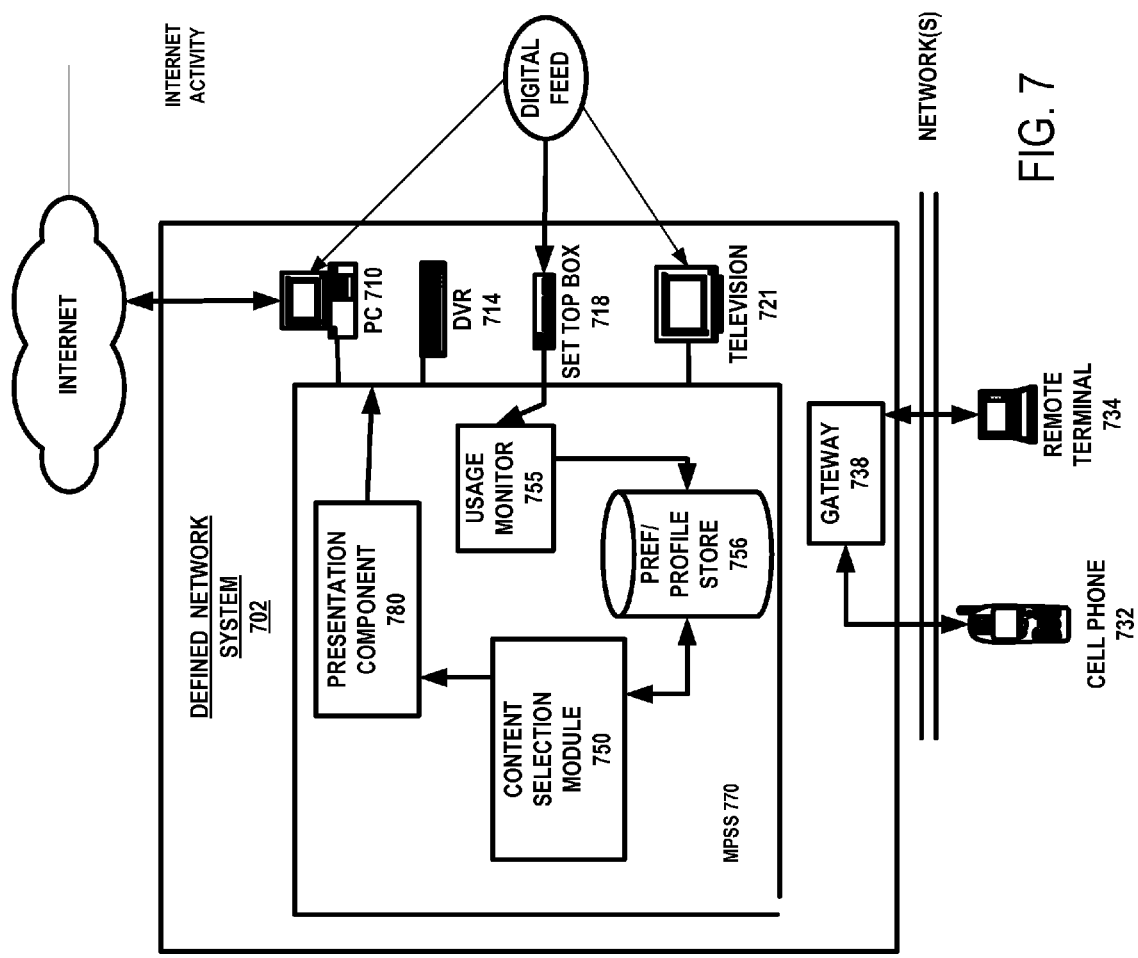
FIG. 7 illustrates an architecture for use with an embodiment such as described in FIG. 6, according to an embodiment.

FIG. 7 illustrates an architecture for use with an embodiment such as described in FIG. 6 or elsewhere. As with prior embodiments, FIG. 7 includes a defined network system that enables a third-party (e.g. advertisers, promoters or content providers) to target content to a user of a defined network based on media consumption activities of the user, without the third-party ever having access to information about the user's media consumption activities. In other words, the third-party is able to target content to the user blindly, and without access to the user's profile information from which the targeting is enabled. Information about the user's media consumption activities remains private.

In an embodiment such as shown by FIG. 7, the designated network of interconnected resources is a "personal network", which is described in more detail with U.S. patent application Ser. No. 10/888,606; the aforementioned application being incorporated by reference herein in its entirety. However, the defined network system may correspond to a home network, multiple linked devices of a user, or just a single personal computer or device.

In an embodiment shown by FIG. 7, the designated network includes a media station computer 710, a digital video recorder (DVR) 714, a set top box 718 for receiving digital television media (e.g. via satellite of cable), and a television monitor 721. Numerous other kinds of devices may also be included in the designated network, such as digital stereos, digital media devices, digital frames, and media tablets. As an example, smart television may integrate processing resources and network compatibility into a television monitor 721, to enable online television/movie services (e.g. online movie 'rental') or DVR functionality. As mentioned, various network configurations are possible, for example, the devices may be interconnected through the computer 710. In one embodiment, a media profile and selection system (MPSS) 770 is implemented on the defined network system 702. The MPSS 770 may be implemented on one device or distributed over multiple devices. In examples described herein MPSS 770 is assumed to be implemented on the personal computer 710. The MPSS 770 may be included as functionality that enables, for example, the computer to establish or integrate with a personal network. However, in other implementations, the MPSS 770 may correspond to programming or logic that operates on a machine independently, or as part of a home network.

According to an embodiment, the defined network system 702 may also include remotely and intermittently connected devices, such as a cell phone 732 and a remote terminal 734 (e.g. laptop or netbook). Such devices may communicate with one or more other devices in the user's system through a gateway 738.

In one embodiment, the MPSS 770 is equipped with components that execute processes for selecting content items and for obtaining profile information about the user of the network. Accordingly, the MPSS 770 includes a content selection module (or system) 750, and one or more usage monitors 755. The usage monitors 755 correspond to programmatic components and agents for procuring data relating to the user's activities on the designated network. In some embodiments, one or more of the usage monitors 755 interface with other devices in the defined network system 702 to retrieve log information regarding the user's activities. The usage monitors 755 may also execute on devices to collect such log information regarding the user's media consumption activities on that device. Accordingly, the one or more usage monitors 755 may operate to monitor and record user actions for consuming media. In the implementation shown, least one usage monitor 755 may interface with the set-top box 718, DVR 714, television 721 and/or television tuner (not shown) in order to record (i) what television programs or movies the user watches, (ii) what television programs or movies the user records for later viewing (and when the user actually views the program after recording). The usage monitor 755 may also execute on computer 710 or other device to record Internet television (e.g. programs that are downloaded) or video viewing, media acquisitions (e.g. purchase of songs or movies from an online site), music preferences and other streaming media services. Still further, as described with other embodiments, the one or more usage monitors 755 may inspect files stored on any of the user's devices, as well data entered or used by the user.

In some implementations in which cellular data devices (e.g. cell or smart phone) is part of the user's defined network system 702, media consumption activities on the cellular data devices (e.g. cell phone 732, electronic book reader or netbook) are also monitored. For example, the user may place-shift content from his home to his cellular device, or use his cellular device to listen to music or see videos/television. MPSS 770 may interface with the cellular device, with devices accessed and used by the cellular device (e.g. set-top box), or with the user's online account(s) where such media consumption activities are enabled for the cellular device. Similarly, one or more embodiments enable the user of the defined network system 702 to monitor machines outside of a local domain or network from which the defined network system 702 is based, but which are owned or operated by the user. For example, system 702 may monitor machines over a wide area network such as the Internet. As described with an embodiment of FIG. 6, the monitoring of usage monitors 755 may extend to metadata data information (e.g. when the user watched a program), as well as user-preferences.

Information gathered by the usage monitors 755 is stored in a profile database 756 (or table or other data structure). The contents of the profile database 756 (i.e., its data) may be kept private, so as to not be accessible to parties other than the user of the defined network system 702.

The content selection module 750 uses information provided from the usage monitors 755 (as well as other information) to select targeted content items for the user's system. The operation of the content selection module 750 is described in more detail with an embodiment of FIG. 8.

Figure 8:
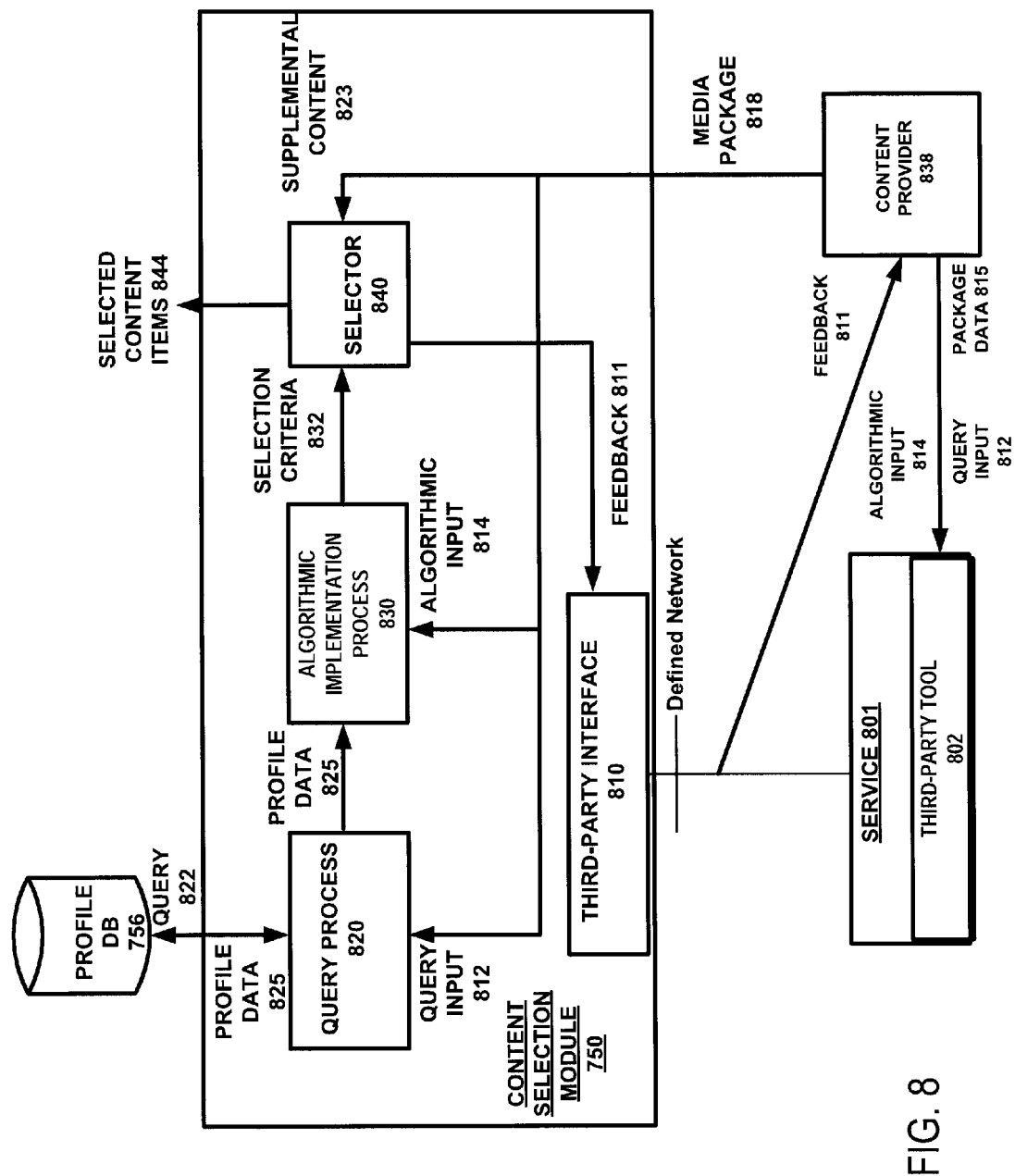
FIG. 8 illustrates a content selection module such as shown and described with an embodiment of FIG. 7, according to an embodiment.

FIG. 8 illustrates a content selection module such as shown and described with an embodiment of FIG. 7. With reference to FIG. 8, the content selection module 750 includes a third-party interface 810 to enable a third-party (e.g. content provider and/or advertiser) to specify inputs that enable the third-party to programmatically target content items (e.g. advertisements and promotions) without accessing the user's private profile information (of consumed media). In the example shown, a content provider 838 (e.g. advertiser) interacts with the third-party interface 810 via a tool 802. The tool 802 may correspond to a programmatic interface that enables the content provider 838 (or other party) to specify query/algorithmic input). More specifically, according to some embodiments, the content provider 838 (i) specifies queries 812 and/or algorithmic input 814 via the tool 802, and (ii) supplies a media package 818 to the user's system that comprises primary and/or supplemental content. Some embodiments enable the tool to create queries and algorithms that run on the user's defined network by, for example, validating the content provider's syntax or logic structure from which queries and algorithms are to be implemented. The tool 802 may also provide the advertiser with sample data to enable the advertiser to model his queries and input prior to dispatch. The sample data may be based on, for example, historical information. Feedback 811 (as described below) from current or past user networks may be used to create the sample data to facilitate the content provider in designing queries and algorithms. As an addition or alternative, the content provider 838 may supply a set of data for use with the tool 802, in order to predict outcome and/or test logic specified with the queries and algorithm.

The primary content may correspond to, for example, a television program or movie, radio station, or music. The supplemental content 823 corresponds to promotional content and advertisements. In one embodiment, the advertisements are provided in form of a collection or library, from which selection is to be made on the user's system.

According to some embodiments, the tool 802 executes outside of the user's defined network system. In one implementation (such as shown), the tool 802 is a web-based interface to enable the content provider 838 to deliver targeted content to users. In other implementations, the tool 802 may reside on or with computing resources (e.g. PC or server) of the content provider 838. In the latter case, the tool 802 may have access to sample, test or model data. In one embodiment, the tool 802 supplies the content provider 838 with package data 815 that enables the queries 812 and/or algorithmic input 814 to be embedded or integrated with the primary and supplemental content that is made available from the content provider 838. The user may request content from the content provider 838. For example, the user may request a content download (program, movie etc.) from the content provider. In response to making the request, the content provider 838 supplies the media package 818, which includes the primary content that the user has requested. The media package 818 may be processed by the user's system to identify query input 812 (specified by the content provider 838) and algorithmic input 814.

In one embodiment, the query input 812 specifies parameters for querying profile database 756. The query input 812 may take various forms. In some implementation, some or all of the query input 812 includes pre-formulated queries from which the content provider 838 (e.g. advertiser or other third-party) can select from using the interface 810. In other embodiments, the query input 812 may include expressions or combinations of inputs that the advertiser can construct to make highly detailed and rich queries of the profile data in the user's system. These include multi-variable queries, such as identification of a given user's favorite shows and whether the user records the favorite shows. A query process 820 may use the input 812 to generate a query 822 on the profile database 756. For example, the query 822 may seek to identify television shows the given user watches during certain periods on weeknights. An algorithmic implementation process 830 may process the algorithmic input 814 to implement a process for selecting supplemental content items 823 from the collection or library of content items provided in the media package 818. The algorithmic input 814 may correspond to algorithms, functions, operations or heuristics, specified by the third-party, which are then used to process the queried profile data 825. As an alternative to query input 812, the algorithmic input may act as the source for query input or generation, at least for some of the queries used in formulating a result under the algorithm. In some embodiments, the query 822 identifies "raw" profile data which is relatively unprocessed. The algorithmic process 830 may process the data to create a synthesized data set, and then further use the synthesized data set (e.g. most popular media consumption activities from identifying all media consumption activities) to perform additional operations including algorithmic decisions, without ever having access to the profile information. In one embodiment, the output of the algorithmic process 830 is selection criteria 832, which may include specific identification or class/type/genre identification. Selection criteria 832 may be stored for subsequent use, or implemented on-the-fly. A selector 840 includes or corresponds to programming or logic that has access to a content roster of the collection of supplemental content items contained in the media package 818 at a given instance in time (or alternatively, after passage of a given duration of time) in connection with a particular event. The selector 840 uses the selection criteria 832 to select specific content items 844 from the content roster. In this way, the algorithm for selecting content may be packaged with multiple content items (e.g. television shows, programs, commercials) from which selection is made. In this way, the content provider 838 can specify an algorithm for making content selection (either primary content, such as a show, movie, or song, or supplementary content, such as ads or commercials). At the content provider's 838 choosing, the algorithm may be of a variable level of complexity. The data used by the algorithm may originate from queries of the profile database. As mentioned, the queries may be simple (e.g. those specified by the advertiser) or complex (e.g. those requiring synthesized information).

With reference again to FIG. 7, presentation component 780 may display or render supplemental content 823 (the "selected content items 844") from a collection of supplemental content items in the media package. The selected content items 844 are displayed in connection with presentation of the primary media. The medium for presenting the selected content items 844 may vary. For example, the selected content items 844 may be incorporated as commercials in slots that are dispersed through programming content. Alternatively, the selected content items 844 may be included as overlays or other forms of ad/promotional content. Still further, depending on the implementation, the presentation component 780 may correspond to, for example, a media player residing on one of the devices, the set-top box 718, DVR 714 or television 721.

Various other usage scenarios, including those that vary the media, delivery media may be implemented with embodiments such as described. For example, while an embodiment of FIG. 8 illustrates the supplemental and primary content being delivered together, alternative implementations may provide for the collection of supplemental content to be delivered independently (or at a different time) than the primary content. Also, the medium used to deliver the collection of supplemental content may vary from that used to deliver the primary content. For example, some or all of the collection of supplemental content may be delivered over a network PC connection, for use with primary content that is broadcast by cable, satellite or over-air. In various embodiments, the collection of supplemental content is packaged with the algorithm/query input, separate from any primary content that the user requested. Still further, the algorithm/query input, supplemental content collection, and primary content may all be delivered at separate times, over separate communication mediums, and/or independently of one another.

As an addition or alternative to embodiments described, the selected content items 844 identify content items that presentation component 780 is to retrieve from a source outside of the defined network system 702. Such content may be rendered at an instance when the user is consuming media. Various systems and implementations for delivering and enabling selection of supplemental content are described below.

With reference to FIG. 8, some embodiments provide that an advertiser or content provider is able to receive feedback as to which advertisement (or targeted content item) was actually rendered to the user. For example, in an implementation in which the media package 818 carries a collection of supplemental content items, the selector 840 on a given user's system may record feedback 811. A third-party interface 810 may report the feedback 811 to either service 801 (if applicable) or content provider 838. In one embodiment, the service 801 collects feedback from multiple users (or user systems) and provides a tally to the content provider as to the number of views/selections made for individual supplemental content items. In FIG. 8, the selected content items 844 (corresponding to supplemental content items selected from media package 818) are recorded, and reported to the content provider/advertiser. For example, the content selector 840 (FIG. 8) or some other component of the user's system may signal back to the content provider 838 (via interface 810 and optionally service 801) feedback 811 in the form of a count, as to which supplemental content items from the collection were actually selected and watched. In this way, the content provider 838 (or advertiser) is able to receive accurate information as to which advertisement item was actually watched. When distributed over an audience (i.e., multiple users on multiple networks), an advertiser is able to receive an accurate count of the number of times a commercial was viewed, or how popular the underlying program was.

In one embodiment, the service 801 receives feedback 811 (e.g. count) from multiple users (e.g. multiple networks), tabulates the feedback 811 for a given content provider, and then sends that content provider information. As a variation or alternative, the content provider 838 may receive real-time feedback (either directly or through the service 801) as to what advertisements were watched on any given system. This feedback 811 would identify the result of the queries/algorithms the content provider 838 provided with the supplemental and/or primary content. In one embodiment, the feedback 811 enables tabulation or counting of the number of instances that individual supplemental content items were selected and watched. In addition, some embodiments provide that the feedback 811 tabulates or counts (from multiple households or defined networks) the number of instances that a primary content was viewed. Thus, embodiments enable generation of 'rating' information, indicating the number of households that watch a given supplemental or primary content. However, unlike conventional approaches, the feedback 811, when tabulated from various households, provides a true count (not statistical extrapolation) of the number of instances that a particular content item (primary or supplemental) was watched.

In some embodiments, content provider 838 (or a targeter) may develop algorithms to increase the count in which advertisements are viewed using statistical feedback and/or focus groups. The targeter can target and tune algorithms for selecting targeted content based on a reliable and actual count of viewers for the targeted content. With such information, a targeter (such as an advertiser) may develop, for example, viewer profiles and categories, and develop understanding as to what/how content is to be targeted to such individuals. For example, advertisers may identify classifications for groups of the population that correspond to "don't fit any category". With feedback as to the counts of viewed content, this category may effectively be shrunk, as the advertiser can tune the algorithm to better enable selections for its viewers.

Still further, with regard to any of the embodiments described, additional embodiments enable the user to provide feedback as to whether they liked or disliked advertisements (e.g. thumbs up or down) that were programmatically selected for them. As an alternative, the feedback may be in form of the user specifying a rating for a particular content (e.g. scale of 1-5). The feedback may be used to weight, or tune selection algorithms to enable better future selection of targeted content.

FIG. 9A illustrates an implementation in which a selection 952 of content items identify links 908 that the presentation component 780 is to use to retrieve content items 912 from a network site 915 at a particular instance, such as during the display/rendering of a movie or television program. In this way, selection 952 identifies links 908/content items 912 that are pertinent to the user of the defined network. In one embodiment, the presentation component (e.g. television system) receives media feed 914 corresponding to a television program, movie, Internet content etc. In connection with receiving the media feed 914, the links 908 enable the presentation component 780 to access and play advertisement media, for example, on a portion of a presentation created by the component 780. As an example, the presentation component 780 may access and play content items located by the links 908 at the occurrence in the media feed (e.g. movie, television program etc.) for an advertisement spot. Numerous variations are possible, such as rendering the content items 912 as banner ads or still images on one or more of the devices that comprise the defined network system 702.

FIG. 9B illustrates an implementation in which a media feed 924 is delivered with a package 922 comprising a plurality of supplemental content items (e.g. advertisements, depicted as $AD_1 \ldots AD_N$ and individually denoted by numeral 722). The media feed may correspond to, for example, a television program or movie that the user downloads from a website or from a network service, using for example, a personal computer or set-top box. The selection 952 identifies select content items 722 of package 924 to display when, for example, an opportunity for displaying advertisements occurs. For example, the presentation component 780 may correspond to a television system (with or without set-top box) that is used to show a television program or movie. The package 922 may correspond to multiple advertisements that are delivered concurrently with the media feed, such as at or just prior to the time an advertisement is to be displayed in the television program. Selection 952 serves to specify which content item in the package is to be used at a given instance, so that the user is shown a television commercial that matches his interest or demographic.

FIG. 9C illustrates another embodiment in which a desired content item (e.g. television show that the user wants to watch) is packaged with advertiser supplied algorithms and queries, as well as a library of supplemental content items, in order to enable the viewer's system to programmatically select an appropriate supplemental content item to view with the desired content item. An embodiment of FIG. 9C is applicable to content that the user can download or request. For example, the user may navigate to a website to select a television program to download and view on a television screen. Alternatively, the user may select a television show by operating a set-top box.

A content provider packages, or otherwise provides, provider data 970, comprising (i) the user's desired content (program 976), (ii) a library 974 of supplemental content items (e.g. commercials, commercial overlays), (iii) selection algorithm data 972. Selection algorithm data 972 includes queries and algorithms such as described with prior embodiments. The content selection module 750 may handle the algorithm data 972 (e.g. via an interface) for purpose of selecting which supplemental content items in the library 974 are to be displayed to the viewer in connection with the rendering of the primary media 976. The content selection module 750 may execute the algorithm, resulting in identification 975 of one or more of the supplemental content items in the library being selected for display to the user. The identified supplemental content items 975 are integrated with the primary media 976 then presented to the user. In an embodiment, the provider data 970 comprising the algorithm data 972, the primary media 976 and the library 974 are delivered to the user at time of playback. The user's system makes the selection of the appropriate supplemental content item on-the-fly, and that content item is displayed to the user at the appropriate time. As an example, the user may download a television program for viewing. The download may include the provider data 970 (so as to include the algorithm data 972 and library 974), but the additional data may be transparent to the user. The user's system initiates playback of the primary media 976, while the algorithm data 972 executes on the user's system to access the user's profile data, and then selects the appropriate television commercials from the library 974. The user's experience is enhanced, because the user views commercials or advertisements that are actually appealing to him/her. But the user's privacy is not affected because no information about the user leaves the user's system.

As an alternative or addition to an embodiment depicted by FIG. 9C, primary media 976 may be packaged as a library (e.g. multiple programs), and the selection algorithm 972 may be implemented to select one program or primary media 976 from the library. The same or different selection algorithm 972 may be used if supplemental content is to be selected.

Still further, while an embodiment of FIG. 9C illustrates that the selection algorithm 972 and the content (including library) are communicated over the same medium (and optionally at the same time), other embodiments may provide for the selection algorithm 972, the primary content 976 and the supplemental content 974 to be transmitted to the defined network using separate mediums. For example, primary content 976 may be broadcast over cable or air, and the selection algorithm may be pushed over the Internet to the user. The primary content 976 may be downloaded using a set-top box, and the selection algorithm 972 and/or supplemental content 974 may be downloaded or received via a personal computer and Internet connection. Numerous such variations are possible.

Still further, the time in which the selection algorithm 972 is received may be different than the time in which the supplemental content library or primary content is received. For example, the supplemental content may be downloaded and stored (e.g. on DVR, PC or smart television), then selected for playback at a later date in connection with a live or recorded playback of primary media.

Targeting Time-Shifted Content

Embodiments recognize numerous inefficiencies that arise when targeting content with the use of time-shifting devices that allow individuals to record live television. Among other issues, the use of time-shifting devices (i) allow individuals to skip or fast-forward through advertisements; (ii) raises the possibility that the advertisements originally packaged with the television program that is recorded becomes stale, particularly with increase of passage of time between when the television show is recorded and when the show is actually viewed; (iii) its difficult to count when a recorded television show is watched, when determining the effectiveness of a television commercial campaign or even the popularity of a program. Embodiments described below enable use of profile information (as described with prior embodiments) to select supplemental content for recorded media programs.

Figure 10:
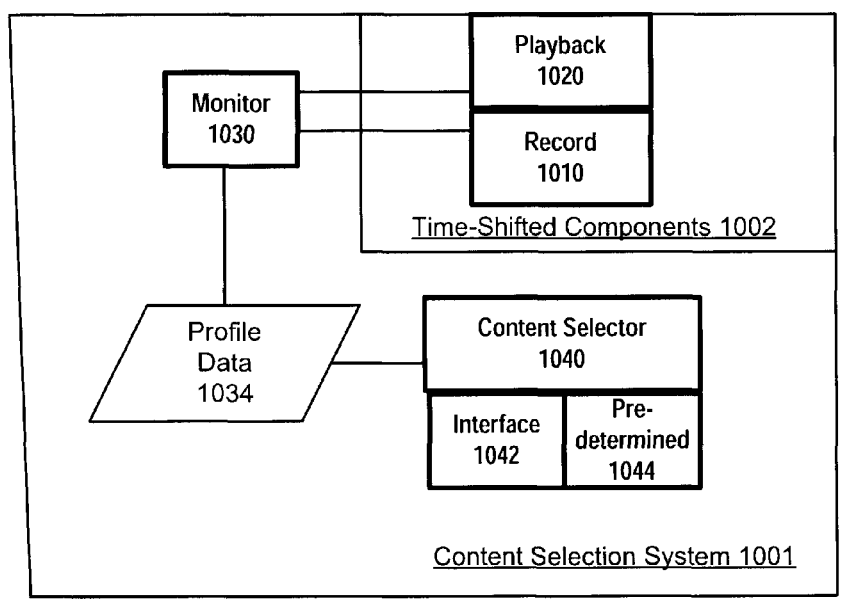
FIG. 10 illustrates a system for implementing content targeting (such as for placement of advertisement content) to supplement time-shifted content, according to an embodiment.

FIG. 10 illustrates a system for implementing content targeting (such as for placement of advertisement content) to supplement time-shifted content, according to an embodiment. Time-shifting components 1002 include a record component 1010 and playback component 1020 which interface with a media broadcasting system. Typical examples of the media broadcasting system include television programming provided via cable television, satellite television, over-air, or via Internet. The record and playback components 1010, 1020 may be provided as part of a single unit, such as on a DVR, or distributed between units or resources of the user (e.g. via personal computer). A system 1001 for enabling targeted content for time-shifted contents include a usage monitor 1030 and a content selector 1040. The usage monitor 1030 may interact with the time-shifting components 1002 to identify profile data 1034, which may include (i) what programs are recorded, (ii) when the programs are being recorded, (iii) when the programs are played back. Other information regarding the user's interaction with the time-shifting components 1002 may also be recorded, such as how often the user fast-forwards or skips content (such as advertisements). According to some embodiments, this profile information could be enhanced as much as possible by other usage data from the network, if available, and also by user volunteered input if available.

The content selector 1040 uses the profile data 1034 to select content for the user at the time of playback occurs. In one embodiment, the user's interaction with the playback component 1020 may trigger the content selector 1040 to identify and place targeted content items in the stream of content that is played back to the user. In one embodiment, the content selector 1040 selects content for placement in the user's stream based on (i) how fresh the playback is—meaning the time between recording and playback; (ii) profile information (such as described with prior embodiments), including demographic and/or volunteer information, that is known about the user. In some embodiments, the content selector's selection is based entirely or in part on rules 1044, such as the passage of time. For example, if more than a designated duration of time has passed, then the content selector 1040 automatically replaces the existing advertisement of the recorded television program with a fresh advertisement. Still further, the rules may specify what commercials or content is to be incorporated in the playback based on information (e.g. genre) known of the recorded program or of the user of the device. The rules 1044 may operate independent or even without need of a third-party interface 1042, such as described below.

In even a more simple approach, time shifting component 1002 has stored on it multiple advertisements and supplemental content that are time appropriate. For example, time shifting component 1002 may store commercials that are time appropriate regardless of the program that is stored. Alternatively, individual programs may be recorded for later viewing with a set of advertisements that are selected in part for that program, and some of the individual advertisements in the set may be appropriate for certain durations after the recording takes place. For example, a set of commercials may include multiple movie trailers. When the user plays back the recorded program, a movie trailer is played in one of the recorded slots, but the movie trailer is selected based on the calendar date of the playback. The movie trailer that is played in the slot is selected based on the proximity of the time of playback to the premier of the movie. Similarly, product commercials may be displayed based on whether a sale promotion for the product exists at the time playback occurs. Commercials and other content for time shifting component 1002 may be downloaded and stored on a regular basis.

As an additional or alternative embodiment, the content selector 1040 selects content for placement in the user's stream based on input from an advertiser or other third-party. This input may correspond to queries and algorithms, such as described with an embodiment of FIG. 8. Accordingly, an interface 1042 for use by advertisers and third-parties is provided such as described with an embodiment of FIG. 8. The profile information 1034 may extend to information that is determined from other devices, or the profile information may be specific to DVRs or other time-shifting activities. Likewise, the queries and algorithms specified from the advertiser can be specific to time-shifting activities, or broader to include other media consumption activities, related metadata, device information and user-volunteered information. In selecting supplemental content for rendering at time of playback, the content selector 1040 may select from content items that are local to the time-shifting components, the user-defined network, or alternatively remote from the devices/user-defined network.

As an example of an embodiment of FIG. 10, time-shifting components 1002 may correspond to a DVR that stores media feeds from broadcast television. In this context, the content selection system 1001 is used to supplement or select advertisements that the user views when playing back recorded programs. The content selector 1040 may be embedded within, for example, a DVR, or may operate to interface with the device, to provide supplemental content that is fresh and targeted for the user. By fresh, the supplemental content is pertinent to the user at the time the user plays back the recorded media, rather than when the user records the media. In one embodiment, the DVR may maintain a library of supplemental content items. For example, the DVR may receive supplemental content items, either at the time of recording, or after recording has taken place, and then store the content items for subsequent review and selection. For example, some embodiments contemplate that DVR receives television commercials at various instances independent of activities. The commercials may be received based on profile information (i.e. selected by content selector 1040), or independent of profile information, in which case the content selector 1040 selects from the commercials at the time of playback. Thus, some embodiments contemplate that at the time of playback, both profile information and freshness of the commercial (how relevant it is to the particular instance of playback) can be relevant factors in making determinations. These television commercials may be provided to the DVR separate from the television program being recorded. As a variation, the recorded television program may be delivered with multiple commercials. Still further, the content selector 1040 may retrieve content items for inclusion in the programs at time of playback.

In some DVR applications, a service is provided that shows the user advertisements to coincide with when the user fast-forwards or watches stored television commercials. In such applications in particular, the content selector 1040 enables the DVR to render commercials or advertisements that are pertinent to the user at the time of playback. As mentioned, the content may be local to the DVR. In other embodiments, the content may be local to the user's defined network, but not necessarily local to the DVR. For example, a catalog or package of content items may be stored on the DVR or elsewhere in the user-defined network, and the content selector 1040 may select from the stored package. Still further, the content selector 1040 may retrieve selected content items from locations that are remote to the user-defined network. All of the embodiments described may be implemented without any of the profile data 1034 being communicated outside of the user's device or defined network.

Still further, in some embodiments relating to DVR applications, the user's actions with regard to advertisements may be monitored. Individual instances in which the user skips through or fast-forwards an advertisement may be counted. A user may be given an allotment of instances in which the user can fast-forward or skip advertisements in a recorded program. The allotment may correspond to a count (e.g. no more than three instances per week) or percentage (e.g. the user can skip through half of the advertisements). In such embodiments, the user's ability to skip through or fast-forward through advertisements may be based on the number of prior instances in which the user skipped or fast-forwarded through advertisements. Thus, for example, the user is forced to watch at least some advertisements, based on prior history of skipping/watching advertisements. A control mechanism may be implemented as a component in FIG. 10 to enable or disable the user's ability to skip or fast-forward advertisements selected for the user, based on whether the number of past instances in which the user skipped or fast-forwarded advertisements exceeded some pre-determined threshold.

As with embodiments described above, the number of times stored supplemental content is displayed on, for example, a DVR (or smart television), may be counted and fed back to a targeter or the content provider. In addition, the time of playback for the supplemental content item may be recorded relative to the time the primary content was first recorded or broadcast or made available.

CONCLUSION

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A method for targeting content to a user, the method being implemented by one or more processors and comprising steps of:
   (a) monitoring activities of a user in relation to one or more devices of the user, the one or more devices forming at least a portion of a personal network of the user, wherein the activities of the user include media consumption activities;
   (b) determining profile information based at least in part on the monitored activities of the user;
   (c) receiving a content package on at least one of the one or more devices of the user, the content package including (i) a desired content of the user, (ii) data that corresponds to a library of supplemental content items, and (iii) a selection algorithm, the content package being communicated from a source that is external to the personal network of the user;
   (d) selecting one or more supplemental content items from the library of supplemental content items, wherein selecting the one or more supplemental content items is based at least in part on the selection algorithm received from the source that is external to the personal network of the user; and
   wherein (a) through (d) are performed on one or more devices of the personal network and without communicating the profile information outside of the personal network of the user.

2. The method of claim 1, wherein selecting the one or more supplemental content items is based at least in part on a time when the desired content is played back on one or more devices of the user.

3. The method of claim 2, wherein selecting the one or more supplemental content items is based at least in part on a passage of time as between when the content package is received and when the desired content is played back on the one or more devices of the user.

4. The method of claim 3, further comprising adding one or more supplemental content items to the library of supplemental content items in response to the passage of time exceeding a designated duration.

5. The method of claim 1, wherein the individual supplemental content items in the library of supplemental content items each corresponds to a commercial.

6. The method of claim 1, wherein the data that corresponds to a library of supplemental content items includes links that identify a corresponding supplemental content item on a network external to the personal network of the user.

7. The method of claim 1, wherein the data that corresponds to a library of supplemental content items includes media files that are stored on the personal network of the user.

8. The method of claim 1, wherein monitoring activities of the user includes monitoring two or more of (i) a song that the user has stored and plays back on one or more of the devices of the personal network, (ii) streaming media that the user receives on one or more of the devices of the personal network, or (iii) a broadcast transmission.

9. A computer system comprising:
   one or more processors to (i) monitor activities of a user in relation to one or more devices of the user, and (ii) determine profile information based at least in part on the monitored activities, the one or more devices forming at least a portion of a personal network of the user, wherein the activities of the user include media consumption activities;
   a network interface to receive a content package on at least one of the one or more devices of the user, the content package including (i) a desired content of the user, (ii) data that corresponds to a library of supplemental content items, and (iii) a selection algorithm, the content package being communicated from a source that is external to the personal network of the user; and
   wherein the one or more processors select the one or more supplemental content items from the library of supplemental content items based at least in part on the selection algorithm received from the source that is external to the personal network, and without communicating the profile information outside of the personal network of the user.

10. The computer system of claim 9, wherein the one or more processors select supplemental content items based at least in part on a time when the desired content is played back on one or more devices of the user.

11. The computer system of claim 10, wherein the one or more processors select the supplemental content items based at least in part on a passage of time as between when the content package is received and when the desired content is played back on the one or more devices of the user.

12. The computer system of claim 11, wherein the one or more processors add one or more supplemental content items to the library of supplemental content items in response to the passage of time exceeding a designated duration.

13. The computer system of claim 9, wherein the individual supplemental content items in the library of supplemental content items each correspond to a commercial.

14. The computer system of claim 9, wherein the data that corresponds to a library of supplemental content items includes links that identify a corresponding supplemental content item on a network external to the personal network of the user.

15. The computer system of claim 9, wherein the data that corresponds to a library of supplemental content items includes media files that are stored on the personal network of the user.

16. The computer system of claim 9, wherein the one or more processors monitor activities of the user by monitoring two or more of (i) a song that the user has stored and plays back on one or more of the devices of the personal network, (ii) streaming media that the user receives on one or more of the devices of the personal network, or (iii) a broadcast transmission.

17. A non-transitory computer-readable medium that stores instructions for targeting content to a user, the instructions being executable by one or more processors to perform operations that comprise:
   (a) monitoring activities of a user in relation to one or more devices of the user, the one or more devices forming at least a portion of a personal network of the user, wherein the activities of the user include media consumption activities;
   (b) determining profile information based at least in part on the monitored activities of the user;
   (c) receiving a content package on at least one of the one or more devices of the user, the content package including (i) a desired content of the user, (ii) data that corresponds to a library of supplemental content items, and (iii) a selection algorithm, the content package being communicated from a source that is external to the personal network of the user;

(d) selecting one or more supplemental content items from the library of supplemental content items, wherein selecting the one or more supplemental content items is based at least in part on the selection algorithm received from the source that is external to the personal network of the user; and wherein (a) through (d) are performed without communicating the profile information outside of the personal network of the user.

18. The computer-readable medium of claim 17, wherein instructions for selecting the one or more supplemental content items include instructions for selecting the one or more supplemental content items based at least in part on a time when the desired content is played back on one or more devices of the user.

19. The computer-readable medium of claim 18, wherein instructions for selecting the one or more supplemental content items include instructions for selecting the one or more supplemental content items based at least in part on a passage of time as between when the content package is received and when the desired content is played back on one or more devices of the user.

20. The computer-readable medium of claim 19, further comprising instructions for adding one or more supplemental content items to the library of supplemental content items in response to the passage of time exceeding a designated duration.

21. The computer-readable medium of claim 17, wherein the individual supplemental content items in the library of supplemental content items each corresponds to a commercial.

22. The computer-readable medium of claim 17, wherein the data that corresponds to a library of supplemental content items includes links that identify a corresponding supplemental content item on a network external to the personal network of the user.

23. The computer-readable medium of claim 17, wherein the data that corresponds to a library of supplemental content items includes media files that are stored on the personal network of the user.

24. The computer-readable medium of claim 17, wherein the instructions for monitoring activities of the user include instructions for monitoring two or more of (i) a song that the user has stored and plays back on one or more of the devices of the personal network, (ii) streaming media that the user receives on one or more of the devices of the personal network, or (iii) a broadcast transmission.

25. A computer system comprising:
means for monitoring activities of a user in relation to one or more devices of the user, the one or more devices forming at least a portion of a personal network of the user, wherein the activities of the user include media consumption activities;

means for determining profile information based at least in part on the monitored activities of the user;

means for receiving a content package on at least one of the one or more devices of the user, the content package including (i) a desired content of the user, (ii) data that corresponds to a library of supplemental content items, and (iii) a selection algorithm, the content package being communicated from a source that is external to the personal network of the user; and means for selecting one or more supplemental content items from the library of supplemental content items, wherein selecting the one or more supplemental content items is based at least in part on the selection algorithm received from the source that is external to the personal network of the user, without communicating the profile information outside of the personal network of the user.

26. The computer system of claim 25, wherein the one or more supplemental content items are selected based at least in part on a time when the desired content is played back on one or more devices of the user.

27. The computer system of claim 26, wherein the one or more supplemental content items are selected based at least in part on a passage of time as between when the content package is received and when the desired content is played back on the one or more devices of the user.

28. The computer system of claim 27, further comprising means for adding one or more supplemental content items to the library of supplemental content items in response to the passage of time exceeding a designated duration.

29. The computer system of claim 25, wherein the individual supplemental content items in the library of supplemental content items each corresponds to a commercial.

30. The computer system of claim 25, wherein the data that corresponds to a library of supplemental content items includes links that identify a corresponding supplemental content item on a network external to the personal network of the user.

31. The computer system of claim 25, wherein the data that corresponds to a library of supplemental content items includes media files that are stored on the personal network of the user.

32. The computer system of claim 25, wherein the monitored activities include two or more of (i) a song that the user has stored and plays back on one or more of the devices of the personal network, (ii) streaming media that the user receives on one or more of the devices of the personal network, or (iii) a broadcast transmission.

* * * * *